(12) United States Patent
Duran et al.

(10) Patent No.: US 12,192,650 B2
(45) Date of Patent: *Jan. 7, 2025

(54) LOW FRAME RATE NIGHT VISION ON VIDEO CAMERA

(71) Applicant: Google LLC, Mountain View, CA (US)

(72) Inventors: Bill Duran, Santa Cruz, CA (US); Adrian Mircea Proca, Santa Cruz, CA (US); Wei Zhong, San Jose, CA (US); Siddarth Raghunathan, Millbrae, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,964

(22) Filed: Sep. 25, 2023

(65) Prior Publication Data
US 2024/0040272 A1 Feb. 1, 2024

Related U.S. Application Data

(63) Continuation of application No. 17/638,714, filed as application No. PCT/US2020/049480 on Sep. 4, 2020, now Pat. No. 11,805,328.
(Continued)

(51) Int. Cl.
*H04N 23/951* (2023.01)
*H04N 23/61* (2023.01)
(Continued)

(52) U.S. Cl.
CPC .......... *H04N 23/951* (2023.01); *H04N 23/61* (2023.01); *H04N 23/667* (2023.01); *H04N 23/73* (2023.01)

(58) Field of Classification Search
CPC ...... H04N 23/95; H04N 23/61; H04N 23/667; H04N 23/73; H04N 23/6811; H04N 23/71; H04N 23/741; H04N 7/183
See application file for complete search history.

(56) References Cited

U.S. PATENT DOCUMENTS 10,063,793 B2 * 8/2018 Honda ................... H04N 23/75
10,200,572 B1 2/2019 Fotland et al.
(Continued)

FOREIGN PATENT DOCUMENTS

| EP | 0956695 | 11/1999 |
|---|---|---|
| JP | 2013197650 | 9/2013 |
| WO | 2021046402 | 3/2021 |

OTHER PUBLICATIONS

"Ex Parte Quayle Action", U.S. Appl. No. 17/638,714, filed Apr. 20, 2023, 6 pages.
(Continued)

*Primary Examiner* — Ahmed A Berhan
(74) *Attorney, Agent, or Firm* — Colby Nipper PLLC

(57) ABSTRACT

An electronic device receives a first plurality of images of a scene captured by an image sensor of an electronic device, receives an ambient light level proximate to the electronic device, and determines whether the ambient light level is less than a first threshold value. In accordance with a determination that the ambient light level is less than the first threshold value, the electronic device detects motion in the scene based on one or more of the first plurality of images. In accordance with detecting motion in the scene, the electronic device receives a second plurality of images of the scene captured by the image sensor of the electronic device, forms a composite image from two or more of the second plurality of images, and causes the composite image to be presented for display on a user device.

20 Claims, 12 Drawing Sheets

Related U.S. Application Data

(60) Provisional application No. 62/897,231, filed on Sep. 6, 2019.

(51) Int. Cl.
    *H04N 23/667*    (2023.01)
    *H04N 23/68*     (2023.01)
    *H04N 23/73*     (2023.01)

(56)              References Cited

U.S. PATENT DOCUMENTS 10,567,674 B2 *   2/2020   Kirsch .................. H04N 5/265
   11,805,328 B2     10/2023   Duran et al.
  2016/0337600 A1    11/2016   Honda
  2022/0224832 A1     7/2022   Duran et al.

OTHER PUBLICATIONS

"International Preliminary Report on Patentability", Application No. PCT/US2020/049480, Mar. 8, 2022, 10 pages.
"International Search Report and Written Opinion", Application No. PCT/US2020/049480, Nov. 30, 2020, 13 pages.
"Notice of Allowance", U.S. Appl. No. 17/638,714, filed Jun. 30, 2023, 9 pages.
"Foreign Office Action", EP Application No. 20775517.4, Jun. 26, 2024, 4 pages.

* cited by examiner

LOW FRAME RATE NIGHT VISION ON VIDEO CAMERA

RELATED APPLICATIONS

This application is a continuation of and claims priority to U.S. Non-Provisional patent application Ser. No. 17/638,714, filed on Feb. 25, 2022, which in turn is a national stage entry of International Application No. PCT/US2020/049480, filed Sep. 4, 2020, which in turn claims priority to U.S. Provisional Application 62/897,231, filed Sep. 6, 2019, the disclosures of which are incorporated herein by reference in their entireties.

This application is related to U.S. Pat. No. 9,117,134, issued Aug. 25, 2015, and International Patent Application No. PCT/US2019/041863, filed Jul. 15, 2019, each of which is hereby incorporated by reference in its entirety.

TECHNICAL FIELD

This application relates generally to electronic imaging devices, including but not limited to imaging systems configured to operate in normal and low light environments.

BACKGROUND

Digital imaging systems capture image frames as a sequence at a particular frame rate, compress the frames, and send them as a video stream to a storage medium, either local or cloud-based, for storage and retrieval. Processing systems may analyze the video stream to detect motion or other objects of interest for use in, for example, a security system.

When capturing video streams, imaging systems may use ambient lighting sources to illuminate the scene and/or adjust shutter speed and/or image sensor sensitivity to produce usable images in low light. When there is not enough ambient light to adequately illuminate the scene, motion detection and object recognition processes cannot adequately operate. As a result, some cameras use infrared (IR) lighting when there is not enough ambient light to adequately illuminate the scene. Video cameras using IR lighting must mechanically remove an IR filter in proximity to the image sensor and enable an IR light source, such as a set of IR light emitting diodes (LEDs) to provide illumination for the scene. In addition to a mechanically switchable IR filter and an IR light source, these cameras also require additional hardware logic, image processing pipeline features, and software to process the IR illuminated images into a black and white video stream. There is additional cost associated with having a mechanically switchable IR filter and an IR light source. There is significant power applied to the IR light source which translates to significant thermal load on the imaging system. Moreover, in products having low profiles or otherwise having spatially limited designs, there is no room for IR light sources, nor is there space available to implement a switchable IR filter.

As such, there is a need for imaging systems which can provide video streams for image viewing, motion detection, and object recognition in low lighting conditions without the need for IR illumination.

SUMMARY

Accordingly, various implementations of an improved imaging system are described in this application. The implementations described herein provide a new approach for low light and very low light video capture that does not require IR illumination. Instead, the implementations described herein make dynamic use of compositions of multiple still images captured at variable frame rates and/or exposures in order to supplement image viewing, motion detection, and object recognition processes when there are low levels of ambient light. The implementations described herein are configured for use in products with imaging systems that can be situated in variably lit, or poorly lit, environments. Example products include electronic assistant devices with cameras, doorbell cameras, and security cameras. By removing the requirement for IR illumination in such products, there is no added cost to obtain a video stream capable of supporting high quality viewing and object recognition, and additional space within a product so configured is saved by not needing additional hardware for IR illumination. In addition, such products require less power for operation in low or very low light conditions, which decreases the thermal load that must be managed.

Implementations of the improved imaging system described herein capture and process image data in accordance with the level of ambient light in proximity to the imaging system. When the ambient light level is high enough so that motion detection and object recognition processes may be reliably carried out on images captured by the imaging system, the imaging system provides the captured images to the motion detection and/or object recognition processes and provides the captured images for viewing. Captured images may be viewed as still images, as a video clip, or as a video stream.

When the ambient light level drops below a threshold at which (i) motion detection and/or object recognition processes using the captured images do not produce reliable results, or (ii) the quality of the captured images is too low for viewing, the imaging system uses a multiple-frame composition process to produce higher quality composite frames. The imaging system uses the higher quality composite frames as the basis for motion detection and/or object recognition processes. In some implementations, the imaging system also provides the higher quality composite frames for viewing.

When the ambient light level is too low for captured images to be used for object recognition but high enough for the captured images to be used for motion detection, the imaging system performs a motion detection process on the captured images. Upon detection of motion using the captured images, the imaging system performs an object recognition process using higher quality composite frames. In some implementations, the process for producing higher quality composite frames is triggered by the detection of motion using the lower quality captured frames, since the higher frame rate of the captured frames allows for motion detection results having lower latency and higher accuracy. Upon detection of motion, the object recognition process analyzes the higher quality composite frames in order to reveal more information than the lower quality captured frames.

In addition to enabling more reliable person/object recognition processes, the higher quality composite frames inserted into the video stream allow a user to more clearly see what is happening in the scene captured by the imaging system.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1A:
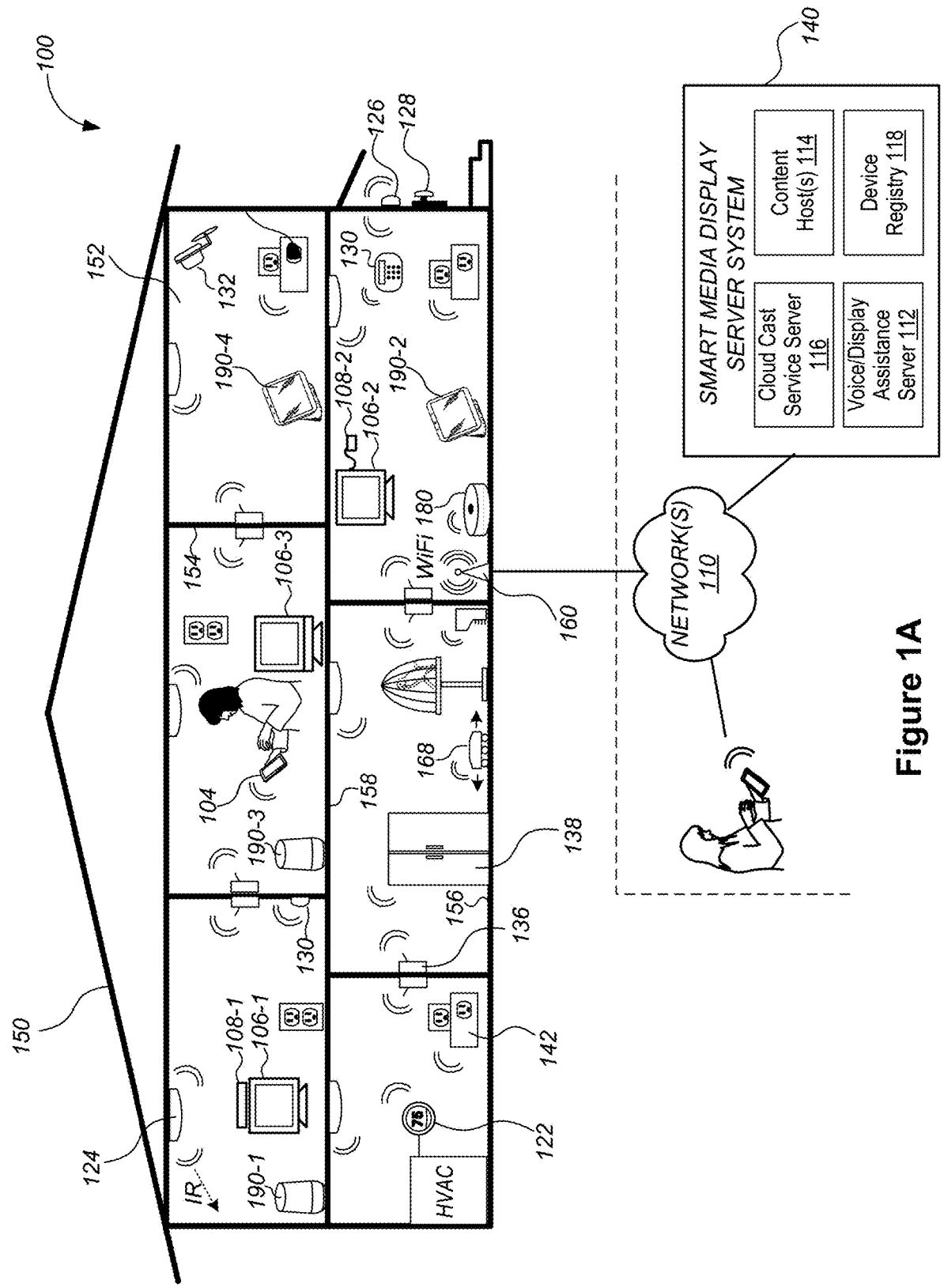
FIG. 1A is an example environment in accordance with some implementations.

Low light imaging is a challenge in both conventional and digital imaging systems. When capturing a video stream of a dimly lit scene, the captured image frames are subject to image noise, which looks like random variations in brightness from pixel to pixel. For some cameras with relatively small lenses and sensors, another source of noise is the natural variation of the number of photons entering the lens, called shot noise. Further, variations in image sensor electronics introduce random errors, called read noise, when converting the electronic charge resulting from light hitting each image sensor pixel to a number. These and other sources of randomness contribute to the overall signal-to-noise ratio (SNR), a measure of how much the image stands out from these variations in brightness. The lower the ambient light in proximity to the camera, the lower the SNR, which results in low quality video streams. The lower the quality, the less reliable processes like motion detection and object recognition are.

In some environments, such as residential or business environments, products and applications use motion detection and object recognition processes to provide services for users. For instance, a security system may consist of a network of cameras which the user has an interest in monitoring day and night. Video streams produced by outdoor cameras at night and indoor cameras in dark rooms may suffer from prohibitively low SNR without a way to supplement or otherwise replace natural light sources in low lighting conditions. Occupants of environments have an interest in receiving detailed motion detection, objection recognition, and face/person recognition around their homes, both inside and outside, especially in low light conditions. Therefore, the low SNR that results from low lighting conditions may negatively affect the ability for these security systems to perform the vital person and object recognition services that occupants have an interest in.

In addition, electronic assistant devices are becoming more prevalent in environments, especially devices including cameras. Where a security camera may not be located, an assistant device may be located instead. Environment occupants of have an interest in having access to object and person recognition services when it comes to assistant devices, not only for security reasons but also for customization purposes. If the assistant device can determine who is giving it commands based on facial recognition, or if the device can determine who is in the room (regardless of whether commands are being given), the assistance device can operate various aspects of the environment in accordance with personal preferences associated with the occupant. Therefore, the low SNR that results from low lighting conditions may negatively affect the ability of these assistant devices to perform vital person and object recognition services that occupants desire.

As discussed above, some camera systems include IR lighting for supplementing or replacing natural light sources. However, for reasons regarding cost, space, and power discussed above it is desirable for certain imaging systems to operate in low light conditions without having to rely on IR illumination. For example, certain electronic assistant devices have low profiles (e.g., the electronic assistant device described below with reference to FIG. 1B and/or the camera described below with reference to FIG. 1C). Accordingly, IR illumination components may not fit within the housing of the product.

Accordingly, implementations of a new approach to providing high quality video streams in low light conditions are described herein. As used herein, the term "high quality video stream" describes a video stream which, when provided for display at a user device such as a mobile phone or laptop, conveys to a user an attribute of an object of interest of a scene proximate to the imaging system (e.g., the identity of a person, a type of object, and so forth). As further used herein, the term "high quality video stream" describes a video stream which, when provided as an input to an object recognition process (e.g., software-based computer vision, pattern recognition, and object classification processes), provides adequate information for the process to determine an attribute of an object of interest of a scene proximate to the imaging system (e.g., the identity of a person, a type of object, and so forth).

Implementations of the improved imaging system use a composite image frame technique to produce high quality image frames in low or very low light conditions. A frame produced with this technique is a composite of a plurality of component frames which are aligned and merged. In addition, exposure times of the component frames may be dynamically altered in order to allow more light to reach the image sensor, and the number of component frames used to produce the composite image may also be changed in order to balance time, memory, and quality constraints. In some implementations, the exposure times are not altered; instead, a plurality of frames are captured at the same exposure time, and one or more of these frames are used as a basis for composing a composite frame. As part of the alignment and merging processes, the best parts (e.g., highest contrast areas) of each individual frame are used to compose the final composite frame. Stated another way, the composite frame includes data from two or more of the component frames which were used as a basis for composing the composite frame. In some implementations, not every component frame is used in composing the composite frame; instead, one or more of the component frames are used to compose the composite frame. In some implementations, considerations related to the number of component frames captured to compose each composite frame include (i) the available memory in the input buffer(s) (e.g., the smaller the buffer, the fewer the number of component images may be stored and used to compose a composite image), and (ii) configurable delay (e.g., the higher the number of component frames, the longer the delay between viewing/analyzing a composite frame compared to the underlying trigger associate with the composite frame). Stated another way, while a higher number of component frames may lead to a higher quality composite frame, there may not be enough memory to store all of the component image data, and/or by the time the composite frame is created, any objects in the scene that are captured in the composite image may no longer be in the scene.

The composite frames are provided as a high quality video stream which may be provided for display at a user device and/or used as a basis for person/object recognition.

Details of the aforementioned composite image composition technique are described in U.S. Pat. No. 9,117,134, issued Aug. 25, 2015, and International Patent Application No. PCT/US2019/041863, filed Jul. 15, 2019, each of which is incorporated by reference.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1A is an example environment 100 in accordance with some implementations. The term "environment" may refer to any space which includes one or more network connected or interconnected electronic devices (e.g., devices that perform one or more support functions, such as security cameras, voice assistant devices, and so forth). Example environments include homes (e.g., single-family houses, duplexes, townhomes, multi-unit apartment buildings), hotels, retail stores, office buildings, industrial buildings, yards, parks, and more generally any living space or work space. Environments may sometimes be referred to herein as smart home environments, smart homes, or smart environments.

In addition, the terms "user," "customer," "installer," "homeowner," "occupant," "guest," "tenant," "landlord," "repair person," and the like may be used to refer to a person or persons acting in the context of some particular situations described herein. These references do not limit the scope of the present teachings with respect to the person or persons who are performing such actions or are otherwise present within or in proximity to the environment. Thus, for example, the terms "user," "customer," "purchaser," "installer," "subscriber," and "homeowner" may often refer to the same person in the case of a single-family residential dwelling who makes the purchasing decision, buys a device (e.g., a network connected electronic device), installs the device, configures the device, and/or uses the device. However, in other scenarios, such as a landlord-tenant environment, the customer may be the landlord with respect to purchasing the device, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The environment 100 includes a structure 150 (e.g., a house, office building, garage, or mobile home) with various integrated devices (also referred to herein as "connected," "network connected," "interconnected," or "smart" devices). The depicted structure 150 includes a plurality of rooms 152, separated at least partly from each other via walls 154. The walls 154 may include interior walls or exterior walls. Each room may further include a floor 156 and a ceiling 158. Network connected devices may also be integrated into an environment 100 that does not include an entire structure 150, such as an apartment, condominium, or office space. In some implementations, the devices include one or more of: mobile devices 104 (e.g., tablets, laptops, mobile phones, smartphones, and so forth), display devices 106, media casting or streaming devices 108, thermostats 122, home protection devices 124 (e.g., smoke, fire and carbon dioxide detectors), home security devices (e.g., motion detectors, window and door sensors and alarms) including connected doorbell/cameras 126, connected locksets 128, connected alarm systems 130 and cameras 132, connected wall switches transponders 136, connected appliances 138, WiFi communication devices 160 (e.g., hubs, routers, extenders), connected home cleaning devices 168 (e.g., vacuums or floor cleaners), communication and control hubs 180, and/or electronic assistant devices 190 (also referred to herein as voice assistant devices and display assistant devices).

One or more media devices are disposed in the environment 100 to provide users with access to media content that is stored locally or streamed from a remote content source (e.g., content host(s) 114). In some implementations, the media devices include media output devices 106, which directly output/display/play media content to an audience, and cast devices 108, which stream media content received over one or more networks to the media output devices 106. Examples of the media output devices 106 include, but are not limited to, television (TV) display devices, music players, and computer monitors. Examples of the cast devices 108 include, but are not limited to, medial streaming boxes, casting devices (e.g., GOOGLE CHROMECAST devices), set-top boxes (STBs), DVD players, and TV boxes.

In the example environment 100, media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-3 includes a network connected TV device that integrates an embedded casting unit to stream media content for display to its audience. The media output device 106-2 includes a regular TV display that is coupled to a network connected TV box 108-1 (e.g., Google TV or Apple TV products), and such a TV box 108-2 streams media content received from a media content host server 114 and provides access to the Internet for displaying Internet-based content on the media output device 106-2.

In addition to the media devices 106 and 108, one or more electronic assistant devices 190 are disposed in the environment 100. The electronic assistant devices 190 collect audio inputs for initiating various media play functions of the electronic assistant devices 190 and/or the media devices 106 and 108. In some implementations, the electronic assistant devices 190 are configured to provide media content that is stored locally or streamed from a remote content source. In some implementations, the electronic assistant devices 190 are voice-activated and are disposed in proximity to a media device, for example, in the same room with the cast devices 108 and the media output devices 106. Alternatively, in some implementations, a voice-activated electronic assistant device (e.g., 190-1 or 190-3) is disposed in a room having one or more devices but not any media device. Alternatively, in some implementations, a voice-activated electronic assistant device 190 is disposed in a location having no networked electronic device. This allows for the electronic assistant devices 190 to communicate with the media devices and share content that is being displayed on one device to another device (e.g., from device 190-1 to device 190-2 and/or media devices 108).

The voice-activated electronic assistant device 190 includes at least one microphone, a speaker, a processor and memory storing at least one program for execution by the processor. The speaker is configured to allow the electronic assistant device 190 to deliver voice messages (e.g., messages related to media content items being presented or message as part of a conversation between a user and the electronic assistant device 190). In some embodiments, in response to a user query, the electronic assistant device 190 provides audible information to the user through the speaker. As an alternative to voice messages, visual signals can also be used to provide feedback to the user of the electronic assistant device 190 concerning the state of audio input processing, such as a visual notification displayed on the device.

In accordance with some implementations, an electronic device 190 is a voice-activated interface device that is configured to provide voice recognition functions with the aid of a server system 140. In some implementations, the server system 140 includes a cloud cast service server 116 and/or a voice/display assistance server 112. For example, in some implementations an electronic device 190 includes a network connected speaker that provides music (e.g., audio for video content being displayed on the electronic assistant device 190 or on a display device 106) to a user and allows eyes-free and/or hands-free access to a voice assistant service (e.g., Google Assistant). Optionally, the electronic device 190 is a voice interface device such as a speaker device or a device including a display screen having touch detection capability or no touch detection capability.

In some implementations, the electronic assistant devices 190 integrate a display screen in addition to the microphones, speaker, processor, and memory (e.g., 190-2 and 190-4). The display screen is configured to provide additional visual information (e.g., media content, information pertaining to media content, etc.) in addition to audio information that can be broadcast via the speaker of the electronic assistant device 190. When a user is nearby and the user's line of sight is not obscured, the user may review the additional visual information directly on the display screen of the electronic assistant device. Optionally, the additional visual information provides feedback to the user of the electronic device 190 concerning the state of audio input processing. Optionally, the additional visual information is provided in response to the user's previous voice inputs (e.g., user queries), and may be related to the audio information broadcast by the speaker. In some implementations, the display screen of the voice-activated electronic devices 190 is touch-sensitive and is configured to detect touch inputs on its surface (e.g., instructions provided through the touch-sensitive display screen). Alternatively, in some implementations, the display screen of the voice-activated electronic devices 190 is not a touch-sensitive screen.

When voice inputs from the electronic device 190 are used to control the electronic device 190 and/or media output devices 106 via the cast devices 108, the electronic assistant device 190 enables control of cast-enabled media devices independently of whether the electronic assistant device 190 has its own display. In an example, the electronic device 190 includes a speaker with far-field voice access and functions as a voice interface device for a network-implemented assistant service (e.g., Google Assistant).

The electronic device 190 can be disposed in any room in the environment 100. In some implementations, when multiple electronic assistant devices 190 are distributed in a plurality of rooms, the electronic assistant devices 190 become audio receivers that are synchronized to accept voice inputs from each of the plurality of rooms. For instance, a first electronic device 190-1 may receive a user instruction that is directed towards a second electronic device 190-2 (e.g., a user instruction of "OK Google, show this photo album on the kitchen device.").

Specifically, in some implementations, an electronic device 190 includes a network-connected speaker (e.g., connected through a Wi-Fi network) with a microphone that is connected to a voice-activated personal assistant service (e.g., Google Assistant). A user can issue a media play request via the microphone of the electronic assistant device 190, and ask the personal assistant service to play media content on the electronic assistant device 190 itself and/or on another connected media output device 106. For example, the user can issue a media play request by saying in proximity to the speaker, "OK Google, play cat videos on my living room TV." The personal assistant service then fulfills the media play request by playing the requested media content on the requested device using a default or designated media application.

A user can also make a voice request via the microphone of the electronic assistant device 190 concerning the media content that has already been played and/or is being played on an electronic assistant device 190. For instance, a user may instruct the electronic assistant device to provide information related to a current media content item being displayed, such as ownership information or subject matter of the media content. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic assistant device 190 without involving any other device having a physical user interface.

In some implementations, the electronic assistant device 190 includes a display screen and one-or more built in cameras. The cameras are configured to capture images and/or videos, which are then transmitted (e.g., streamed) to a server system 140 for display on client devices(s) (e.g., authorized client devices 104).

In some implementations, the voice-activated electronic assistant devices 190 can be mounted on, integrated with, and/or supported by a wall 154, floor 156 or ceiling 158 of the environment 100. The integrated devices include intelligent, multi-sensing, network connected devices that integrate seamlessly with each other in a network and/or with a central server or a cloud-computing system to provide a variety of useful functions. In some implementations, a device is disposed at the same location of the environment 100 as a cast device 108 and/or an output device 106, and therefore, is located in proximity to or with a known distance with respect to the cast device 108 and the output device 106.

In some implementations, the environment 100 includes one or more network connected camera systems 132 (also referred to herein as cameras 132). In some embodiments, content that is captured by a camera 132 is displayed on an electronic assistant device 190 at a request of a user (e.g., a user instruction of "OK Google, show the baby room monitor.") and/or according to settings of the environment 100 (e.g., a setting to display content captured by a particular camera 132 during the evening or in response to detecting an intruder).

In some implementations, the environment 100 includes one or more network connected thermostats 122, hazard detectors 124, doorbells 126, door locks 128, alarm systems 130, camera systems 132, wall switches 136, appliances 138 (e.g., refrigerators, stoves, ovens, televisions, washers, and/or dryers), lights, stereos, intercom systems, garage-door openers, floor fans, ceiling fans, wall air conditioners, pool heaters, irrigation systems, security systems, space heaters, window air conditioning (AC) units, motorized duct vents, and so forth.

The environment 100 includes one or more other occupancy sensors (e.g., touch screens, IR sensors, ambient light sensors and motion detectors). In some implementations, the environment 100 includes radio-frequency identification (RFID) readers (e.g., in each room 152 or a portion thereof) that determine occupancy based on RFID tags located on or embedded in occupants. For example, RFID readers may be integrated into the network connected hazard detectors.

In some implementations, in addition to including sensing capabilities, one or more of the devices included in the environment 100 are capable of data communications, including information sharing with other devices, a central server, cloud-computing system, and/or other devices (e.g., the client device 104, the cast devices 108, and/or the electronic assistant devices 190) that are network connected. Similarly, in some implementations, each of the cast devices 108 and the electronic assistant devices 190 is also capable of data communications, including information sharing with other cast devices 108, electronic assistant devices 190, a central server or cloud-computing system 140, and/or other devices (e.g., client devices 104) that are network connected. Data communications may be carried out using any of a variety of custom or standard wireless network protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired network protocols (e.g., Ethernet, HomePlug, etc.), or any other suitable communication protocol, including communication protocols not yet developed as of the filing date of this document.

In some implementations, the cast devices 108, the electronic assistant devices 190 and the other devices included in the environment 100 serve as wireless or wired repeaters. In some implementations, a first one of the cast devices 108 communicates with a second one of the cast devices 108 or one or more other devices via a wireless router. The cast devices 108, the electronic assistant devices 190 and the one or more other devices may further communicate with each other via a connection (e.g., network interface 160) to a network, such as the Internet 110. Through the Internet 110, the cast devices 108, the electronic assistant devices 190 and/or the one or more other devices may communicate with a server system 140 (also referred to herein as a central server system and/or a cloud-computing system). Optionally, the server system 140 may be associated with a manufacturer, support entity, or service provider associated with the one or more devices included in the environment 100 and/or the media content items displayed or otherwise presented to users.

In general, any of the connected electronic devices included in the environment 100 can be configured with a range of capabilities for interacting with users in the environment 100. For example, an electronic device can be configured with one or more microphones, one or more speakers, and/or voice-interaction capabilities in which a user interacts with the electronic device via voice inputs received by the microphone and audible outputs played back by the speakers to present information to users. Similarly, an electronic device can be configured with buttons, switches and/or other touch-responsive sensors (such as a touch screen, touch panel, or capacitive or resistive touch sensors) to receive user inputs, as well as haptic or other tactile feedback capabilities to provide tactile outputs to users. An electronic device can also be configured with visual output capabilities, such as a display panel and/or one or more indicator lights to output information to users visually, as described in U.S. patent application Ser. No. 15/592,120, titled "LED Design Language for Visual Affordance of Voice User Interfaces," which is incorporated herein by reference. In addition, an electronic device included in the environment 100 can be configured with movement sensors that can detect movement of objects and people in proximity to the electronic device, such as a radar transceiver(s) or PIR detector(s), as described in U.S. patent application Ser. No. 15/481,289, titled "Systems, Methods, and Devices for Utilizing Radar-Based Touch Interfaces," which is incorporated herein by reference.

Inputs received by any of these sensors can be processed by the electronic device and/or by a server communicatively coupled with the electronic device (e.g., the server system 140 of FIG. 1A). In some implementations, the electronic device and/or the server processes and/or prepares a response to the user's input(s), which response is output by the electronic device via one or more of the electronic device's output capabilities. In some implementations, the electronic device outputs via one or more of the electronic device's output capabilities information that is not directly responsive to a user input, but which is transmitted to the electronic device by a second electronic device in the environment 100, or by a server communicatively coupled with the electronic device. This transmitted information can be of any type that is displayable/playable by the output capabilities of the electronic device.

The server system 140 provides data processing for monitoring and facilitating review of events (e.g., motion, audio, security, etc.) from data captured by the devices included in the environment 100, such as video cameras 132, doorbells 126 (with embedded cameras), and electronic assistant devices 190. In some implementations, the server system 140 may include a voice/display assistance server 112 that processes video and/or audio inputs (e.g., collected by electronic assistant devices 190, doorbell/cameras 126, or video cameras 132), one or more content hosts 114 that provide media content for display on one or more of the devices included in the environment 100, and a cloud cast service server 116 creating a virtual user domain based on distributed device terminals. In some implementations, the server system 140 also includes a device registry 118 for keeping a record of the distributed device terminals in the virtual user environment. Examples of the distributed device terminals include, but are not limited to the electronic assistant devices 190, cast devices 108, media output devices 106, and/or any other device included in the environment 100. In some implementations, these distributed device terminals are linked to a user account in the virtual user domain. In some implementations, each of these functionalities and content hosts is a distinct server within the server system 140. In some implementations, a subset of these functionalities is integrated within the server system 140.

In some implementations, the network interface 160 includes a conventional network device (e.g., a router). In some implementations, the environment 100 further includes a hub device 180 that is communicatively coupled to the network(s) 110 directly or via the network interface 160. The hub device 180 is further communicatively coupled to one or more of the devices included in the environment 100. In some implementations, one or more of the network connected devices included in the environment 100 optionally communicates with the hub device 180 using one or more radio communication networks (e.g., ZigBee, Z-Wave, Insteon, Bluetooth, Wi-Fi and/or other radio communication networks). In some implementations, the hub device 180 and devices coupled with/to the hub device 180 can be controlled or otherwise interacted with via an application running on a client device 104 (e.g., a mobile phone, household controller, laptop, tablet computer, game console, or similar electronic device). In some implementations, a user of such an application can view status information of the hub device or coupled network connected devices, configure the hub device to interoperate with devices newly introduced to the home network, commission new devices, adjust or view settings of connected devices, and so forth.

Figure 1B:
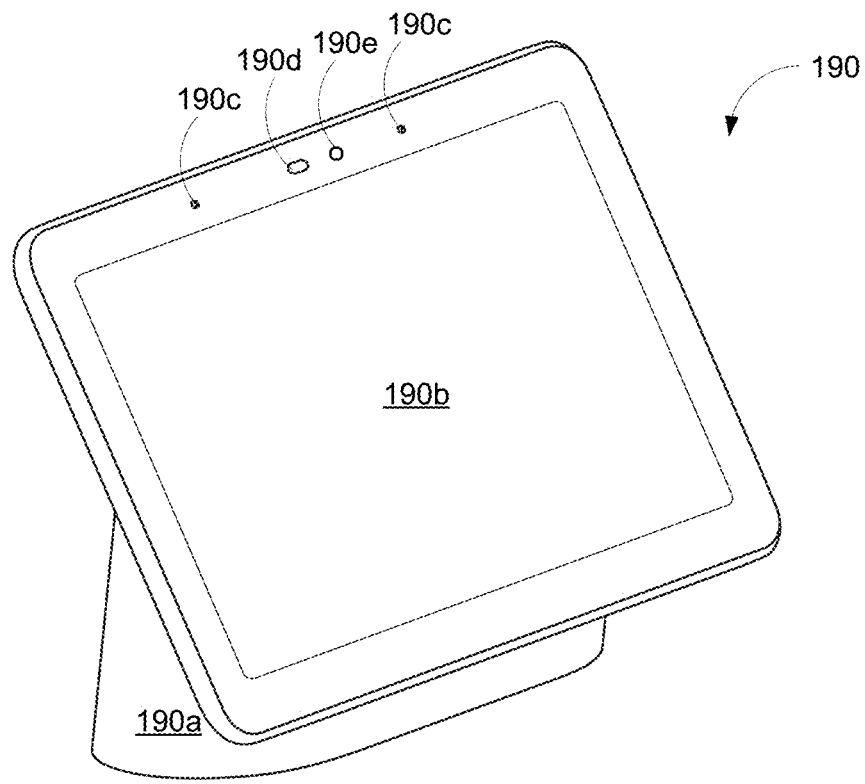
FIG. 1B is a perspective view of an electronic assistant device in accordance with some implementations.

FIG. 1B is a perspective view of an electronic assistant device 190 (e.g., voice-activated electronic assistant device 190-2) in accordance with some implementations. The electronic assistant device 190 includes a base 190a and a screen 190b. The base 190a is configured for sitting on a surface. In some implementations, the electronic assistant device 190 does not include a base and is instead mounted to a surface such as a wall. The screen 190b has a rear surface at which the screen is supported by the base. In some implementations, the electronic assistant device 190 has a substantially narrow bezel area surrounding an active display area of the screen 190b. In some implementations, the bezel area includes a subset of one or more microphone holes 190c, a camera window 190d and a sensor window 190e. One or more microphones (not shown) may be placed behind the microphone holes 190c and configured to collect sound from the ambient of the electronic assistant device 190. An imaging system including a camera module (not shown) may be disposed behind the camera window 190d to capture a video stream in a field of view of the electronic assistant device 190. An ambient light sensor may be disposed behind the sensor window 190e and configured to detect a light condition in the environment 100 where the electronic assistant device 190 sits. The portion of the electronic assistant device 190 behind the screen 190b depicts an example of a low profile space for implementing an image system. In such a space, there may not be adequate room for IR illumination components as discussed above. Regardless of the space issues, however, there are still cost and complexity issues associated with IR illumination that provide motivations for designing products such as the electronic assistant device 190 without IR imaging components as discussed above.

Figure 1C:
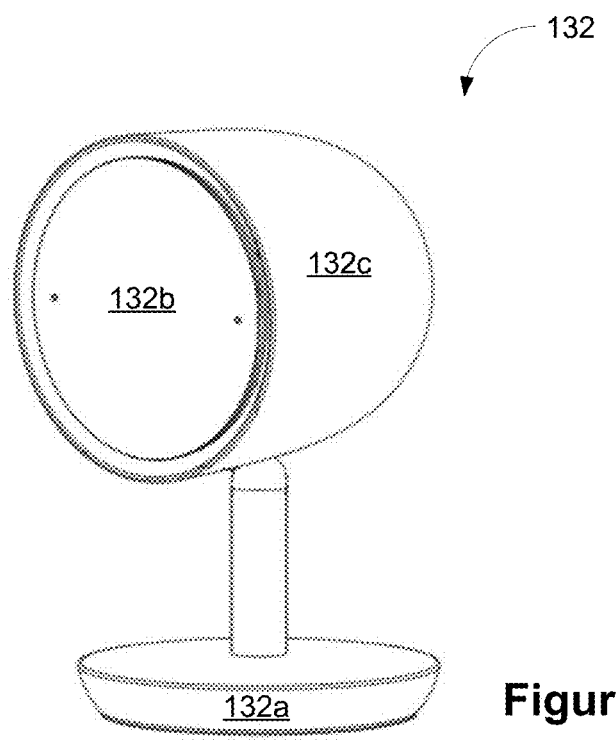
FIG. 1C is a perspective view of a camera in accordance with some implementations.

FIG. 1C is a perspective view of a camera 132 in accordance with some embodiments. The camera depicted in this figure is an example embodiment of a security camera. Other embodiments include but are not limited to doorbell cameras, wall mounted cameras, ceiling mounted cameras, and so forth. Any camera form factor may be implemented without departing from the scope of the inventive concepts described herein. The camera 132 includes a base 132a and an imaging system disposed behind a window 132b inside of an enclosure 132c. In some implementations, the imaging system is configured to capture a video stream of a field of view in proximity to the camera 132. An ambient light sensor may be disposed behind the window 132b and configured to detect a light condition in the environment 100 where the camera 132 sits. In some implementations, the enclosure 132c may implemented as a low profile space in which there is not adequate room for IR illumination components as discussed above. Regardless of the space issues, however, there are still cost and complexity issues with IR illumination that provide motivations for designing products like the camera 132 without IR imaging components as discussed above.

Figure 2:
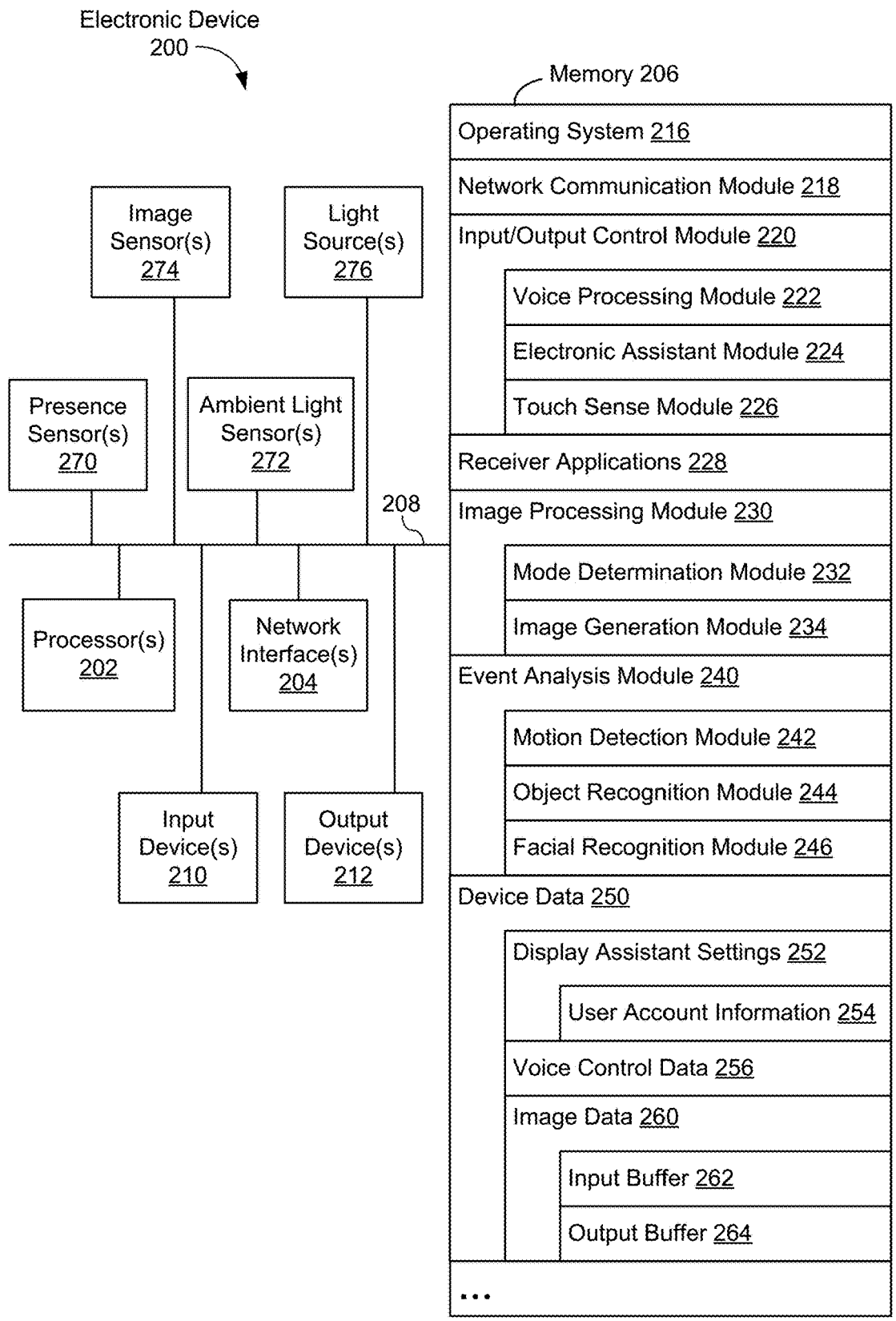
FIG. 2 is a block diagram illustrating an example electronic device in accordance with some implementations.

FIG. 2 is a block diagram illustrating an example electronic device 200. In some implementations, the electronic device 200 is an electronic assistant device (e.g., 190, FIG. 1B). In some implementations, electronic device 200 is a camera (e.g., 132, FIG. 1C). While the inventive concepts disclosed herein may be implemented in any product capable of capturing image data, the present discussion describes an electronic assistant device for illustrative purposes. The use of such a device in this discussion is not meant to be limiting.

In some implementations, the electronic device 200 is a voice interface configured to collect user voice commands in an environment 100. The electronic device 200 typically includes one or more processors 202, one or more network interfaces 204, memory 206, and one or more communication buses 208 for interconnecting these components. The electronic device 200 includes one or more output devices 212, including one or more speakers, a display, and one or more status indicator lights. The electronic device 200 also includes one or more input devices 210 that facilitate user input, including one or more microphones, a volume control, and a privacy control. The volume control is configured to receive a user action (e.g., a press on a volume up button or a volume down button, a press on both volumes up and down buttons for an extended length of time) that controls a volume level of the speakers or resets the electronic device 200. The privacy control is configured to receive a user action that controls privacy settings of the electronic assistant device (e.g., whether to deactivate the microphones). The one or more status indicator lights are configured to indicate at least whether the microphone is deactivated (e.g., muted). In some implementations, the input devices 210 of the electronic device 200 include a touch detection module that is integrated on the display panel and configured to detect touch inputs on its surface. In some implementations, the electronic device 200 includes one or more image sensors 274 included in a camera module configured to capture a video stream of a field of view.

In some implementations, the electronic device 200 further includes one or more presence sensors 270 configured to detect a presence of a user in a predetermined area surrounding the electronic device 200. Under some circumstances, the electronic device 200 operates at a sleep or hibernation mode that deactivates detection and processing of audio inputs, and does not wake up from the sleep or hibernation mode or listen to the ambient (i.e., processing audio signals collected from the ambient) until the presence sensor 270 detects a presence of a user in the predetermined area. An example of the presence sensor 270 is an ultrasonic sensor configured to detect a presence of a user.

In some implementations, the electronic device 200 further includes one or more ambient light sensors 272 (e.g., a white ambient light sensor or an RGB color sensor). The ambient light sensor 272 is configured to detect a light condition in the environment 100 where the electronic device 200 sits. In some implementations, the electronic device 200 is configure to adjust a brightness level and/or a color tone of its screen according to the light condition. In some implementations, the ambient light sensor 272 is disposed behind a bezel area of the screen of the electronic device 200, and exposed to light via a transparent part of the bezel area.

In some implementations, the electronic device 200 further includes one or more light sources 276 configured to emit light towards the field of view of the image sensor 274. The emitted light is configured to supplement low levels of ambient light. In some implementations, the light source 276 includes one or more LEDs configured to project visible light. In some implementations, the light source 276 may be operated at different light intensities in order to supplement varying levels of ambient light.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

Operating system 216 including procedures for handling various basic system services and for performing hardware dependent tasks;

Network communication module 218 for connecting the electronic device 200 to other devices (e.g., the server system 140, cast device 108, client device 104, other voice-activated electronic device(s) 190), and/or other devices included in the environment 100 via one or more network interfaces 204 (wired or wireless) and one or more networks 110, such as the Internet, other wide area networks, local area networks, metropolitan area networks, and so on;

Input/output control module 220 for receiving inputs via one or more input devices 210 enabling presentation of information at the electronic device 200 via one or more output devices 212, including:

Voice processing module 222 for processing audio inputs or voice messages collected in an environment surrounding the electronic device 200, or preparing the collected audio inputs or voice messages for processing at a voice/display assistance server 112 or a cloud cast service server;

Electronic assistant module 224 for displaying additional visual information including but not limited to a media content item (e.g., a video clip), news post, social media message, weather information, personal picture, a state of audio input processing, and readings of devices; and Touch sense module 226 for sensing touch events associated with the touch detection module on a top surface of the electronic device 200; and One or more receiver applications 228 for responding to user commands extracted from audio inputs or voice messages collected in an environment surrounding the electronic device 200, including but not limited to, a media play application, an Internet search application, a social network application and a device application;

Image processing module 230 for processing images captured by the one or more image sensors 274 and creating video streams, including:

Mode determination module 232 for determining ambient light levels in the field of view of the image sensor 274 (e.g., using ambient light sensor 272) and determining an imaging mode (e.g., a normal mode, low light mode, and very low light mode) based on the ambient light level; and Image generation module 234 for setting image capture attributes (frame rate, exposure) based on the imaging mode, creating composite image frames using the attributes, and generating a video stream using individual image frames or composite image frames based on the imagine mode;

Event analysis module 240 for analyzing the image data captured by the image sensor 274 and detecting and recognizing events of interest to an occupant of the environment, including:

Motion detection module 242 for detecting motion in the field of view of the image sensor 274 by, for example, applying image differencing, motion metering, background subtraction, or optical flow using successive images captured by the image sensor 274;

Object recognition module 244 for detecting and recognizing objects in the field of view of the image sensor 274, for example, by using computer vision, pattern recognition, and machine learning techniques; and Facial Recognition module 246 for detecting and recognizing faces in the field of view of the image sensor 274, for example, by using computer vision, facial recognition, and machine learning techniques; and Device data 250 storing at least data associated with the electronic device 200, including:

Electronic assistant settings 252 for storing information associated with the electronic device 200 itself, including common device settings (e.g., service tier, device model, storage capacity, processing capabilities, communication capabilities, etc.) and information of a user account 254 in a virtual user domain to which the electronic device 200 is linked;

Voice control data 256 for storing audio signals, voice messages, response messages and other data related to voice interface functions of the electronic device 200; and Image data 260 for storing images captured by the image sensor 274, including input buffer 262 for storing individual image frames captured by the image sensor, and output buffer 264 for storing images of an output video stream, including individual image frames and composite image frames.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above. In some implementations, one or more of the modules described above is implemented at a cloud-based server system (e.g., server system 140) in addition to, or as an alternative to, being implemented at the assistant device 200. For example, in an alternative implementation, the image processing module 230, the motion detection module 242, the object recognition module 244, and/or the facial recognition module 246, are implemented at a server system 140. In such an implementation, the assistant device 200 can send image data to the server system 140 for processing by one or more of these modules. Stated another way, the electronic device 200 alternatively offloads image processing (e.g., composite image processes implemented by the image generation module 234), motion detection processes, and/or object/facial recognition processes to a cloud-based server system 140. This alternative implementation may benefit from increased storage and processing capabilities of a server system.

Figure 3:
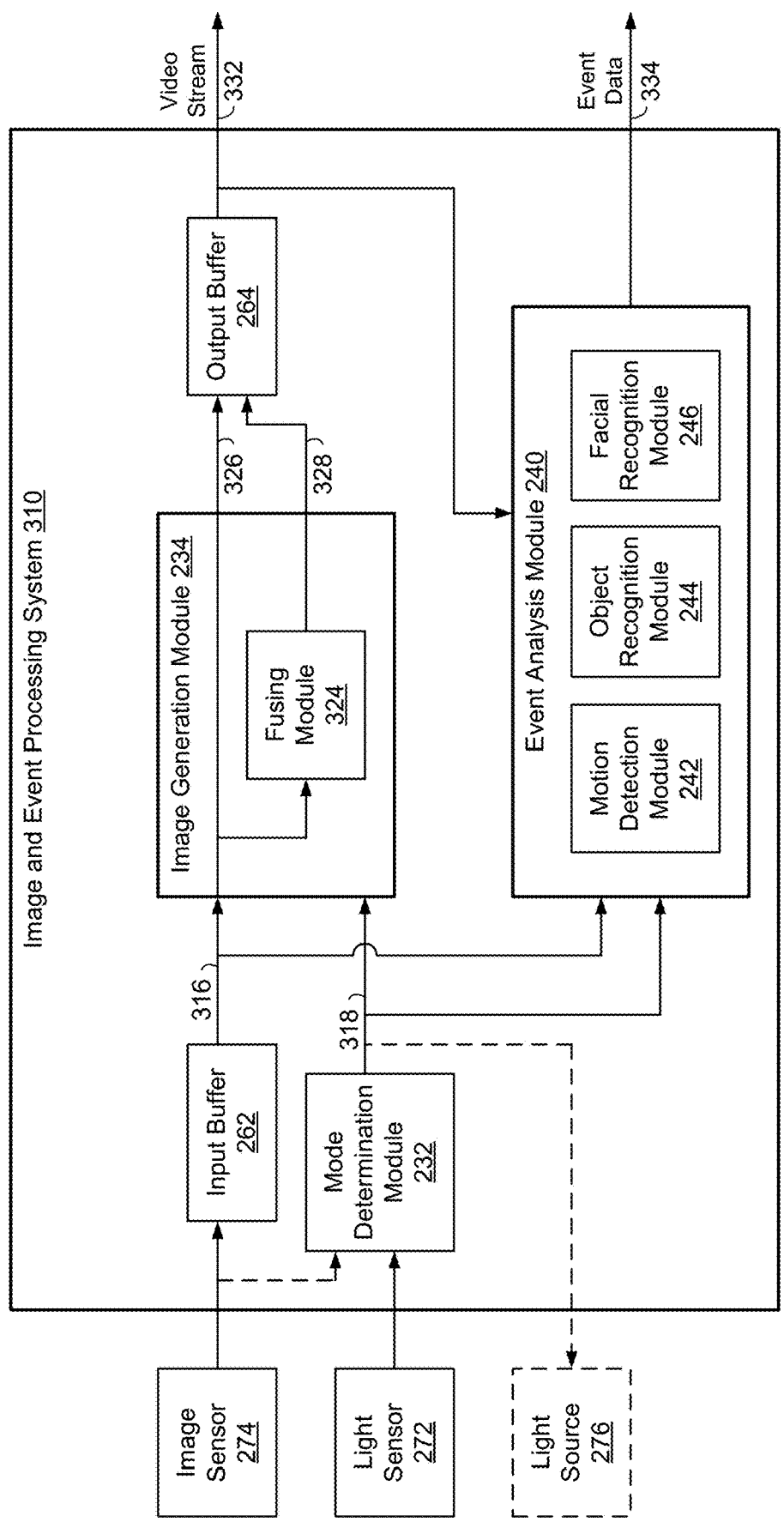
FIG. 3 is a block diagram illustrating an example image and event processing system in accordance with some implementations.

FIG. 3 is a block diagram of an image and event processing system 310, which includes a subset of the modules described with reference to FIG. 2 as well as additional details regarding the flow of image data from the image sensor 274 to a user device of an occupant of the environment. Features shared with FIG. 2 are similarly numbered, and some are not further discussed for purposes of brevity.

Images captured by an image sensor 274 are stored in an input buffer 262. In some implementations, the input buffer 262 is a circular buffer (i.e., frames are stored in a buffer of fixed size, with new frames replacing the oldest frames). A mode determination module 232 determines an ambient light level, based on image data from the captured images or based on data from the ambient light sensor 272 (described in more detail below with reference to FIGS. 7-10). In accordance with the determined imaging mode 318, the image generation module 234 generates, from image frames 316 stored in the input buffer 262, a video stream using single-image frames 326 or composite image frames 328 created by fusing module 324 (described in more detail below with reference to FIG. 5A). Specifically, in normal light mode, the image generation module 234 provides the captured frames 316 for storage in the output buffer 264 (e.g., frames 510, FIG. 5A), thereby causing the video stream to be generated using the captured frames 316/326. Stated another way, each output frame in the video stream 332 corresponds to only one input frame 316 in the normal light mode. In low light modes (low light and very low light), the image generating module 234 uses a fusing module 324 to generate composite frames 328 (e.g., frames 512, 514, and 516, FIG. 5A), wherein each composite frame 328 is generated based on a plurality of captured frames 316, also referred to herein as component frames (e.g., frames 508, FIG. 5A). Stated another way, in low light modes, each composite output frame in the video stream 332 corresponds to a plurality of input frames 316. The use of composite frames causes the video stream to be generated using image frames of higher quality than the input frames that were used to make them (i.e., composite frames 514 are of higher quality than component frames 508, as described with reference to FIG. 5A below). The output buffer 264 stores frames 326 and/or 328, from which they are provided as a video stream 332 to a user device and/or to an event analysis module 240.

The event analysis module 240 includes (i) a motion detection module 242 for performing one or more motion detection processes, (in accordance with some implementations.) an object recognition module 244 for performing one or more object recognition processes, and/or (iii) a facial recognition module 246 for performing one or more facial recognition processes. The event analysis module 240 analyzes the video stream 332, or individual image frames of the video stream 332, or input image frames 316, or a combination thereof, in accordance with the determined mode 318. This analysis is described in more detail below with reference to FIG. 6. In some implementations, based on a low or very low light level determination 318, system 310 causes a light source 276 to supplement the ambient light in order to aid the fusing module 324 in creating high quality composite image frames. For example, even if a light level emitted by the light source 276 is not high enough on its own to substantially influence the quality of captured images 316, the change in light level may be enough to cause the fusing module 324 to require a fewer number of frames to compose a high quality composite image.

In some implementations, in addition to or as an alternative to system 310 outputting the video stream 332 to a user device, the system 310 outputs (or locally stores, or remotely stores at a server system) event data 334 including the results of object/facial recognition to the user device, thereby notifying the user of a type of object that has entered the field of view of the camera (e.g., a car or person), an identity of a person who is in the field of view of the camera, and/or attributes of the person, including whether the person is known or unknown to the system 140. In some implementations, the event data includes one or more of the component images 326 or composite images 328 associated with the event. For example, if the event corresponds with detection of a person in the field of view, the event data 334 may include an identity or an attribute of the person and/or an image of the person.

Figure 4:
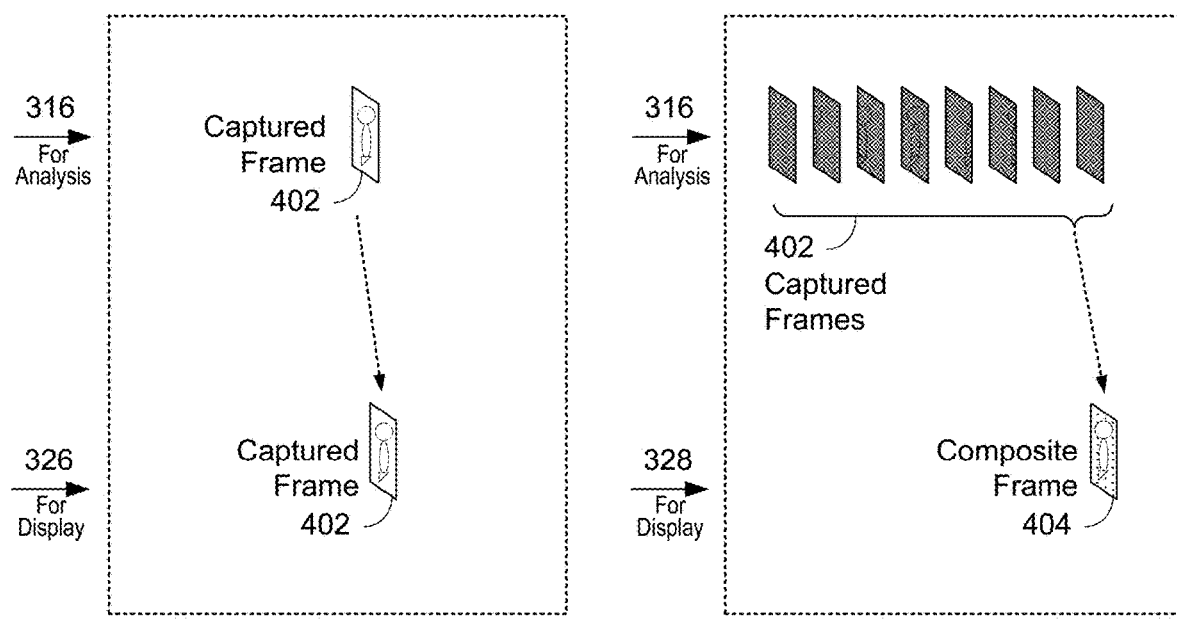
FIG. 4 is a table depicting image processing configurations in accordance with some implementations.

FIG. 4 includes a table summarizing some of the implementations described herein. For implementations in which there are three light modes, different combinations of captured frames 402 (corresponding with FIG. 3-326 and FIG. 5A-510) vs. composite frames 404 (corresponding with FIG. 3-328 and FIG. 5A-511) may be used for viewing, motion detection, and object recognition. For instance, at normal light levels, the quality of captured frames 402 is high enough for viewing at a user device, being used as a basis for motion detection, and being used as a basis for object recognition.

At low light levels (e.g., lower than 3 lux), the quality of captured frames 402 may or may not be high enough for viewing at a user device. In some implementations, the user is given a choice as to which type of frames to view: captured frames 402 at a particular quality and frame rate, or higher quality composite frames 404 at a lower frame rate.

In some implementations, captured frames 402 are displayed by default, while the user has an option to view one or more composite frames 404. In some implementations, composite frames 404 are displayed by default, while the user has an option to view a stream of captured frames 402 at a higher frame rate. At low light levels, the quality of captured frames 402 may not be high enough for object recognition, so higher quality composite frames are used as a basis for object recognition instead. However, the quality of captured frames 402 may still be high enough to be useful for motion detection, which does not require the level of quality that object recognition requires. Thus, captured frames 402 may still be used as a basis for motion detection at low light levels, thus allowing for more accurate and reliable motion detection due to the higher frame rate of the captured frame stream. Stated another way, the low light mode takes advantage of the stream of captured frames 402 captured at a high frame to produce more accurate motion detection results, as well as the high quality composite frames 404 to produce more accurate object recognition results. Since, in some implementations, a motion detection result is used as a trigger for an object recognition process (e.g., the camera just saw motion and a user is interested in who or what is moving in the field of view of the camera), the low light mode provides for (i) accurate and (ii) responsive object detection in low light conditions—accurate due to the use of high quality composite image frames 404, and responsive due to the use of high frame rate streams of captured image frames 402.

At very low light levels (e.g., lower than 0.3 lux), the quality of captured frames 402 may be so low that the frames cannot be used as a basis for viewing, motion detection, or object recognition. Thus, composite frames 404 can be used for viewing, motion detection, and object recognition.

Figure 5A:
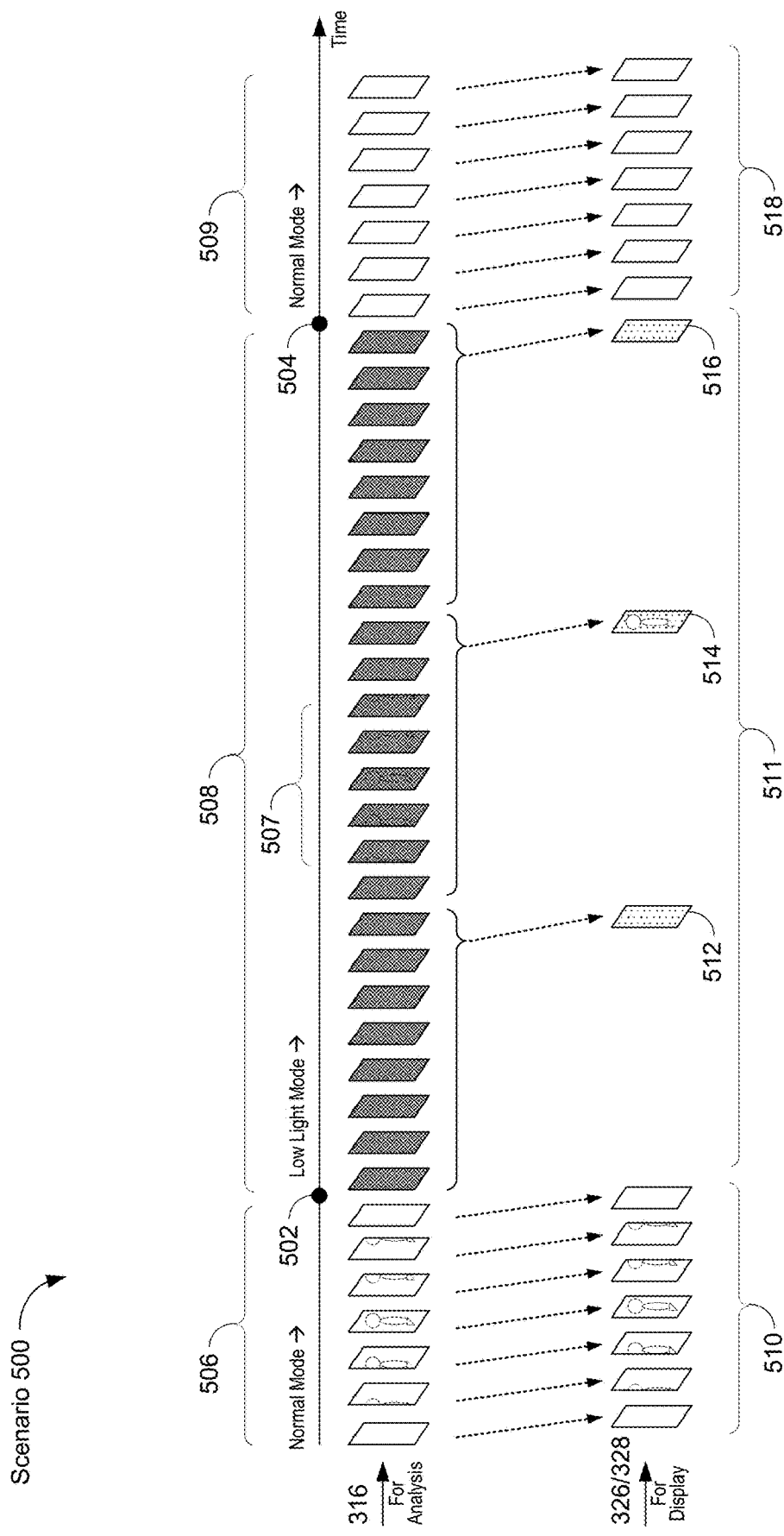
FIGS. 5A-5B are diagrams illustrating example image processing scenarios in accordance with some implementations.

FIG. 5A depicts an example scenario 500 in which a camera module including an image sensor 274 captures successive images 316 (see FIG. 3). Images 506 are captured while there is adequate ambient light to for the image generation module 234 to generate images of high enough quality to be reliable sources for object/person recognition (244 and 246, FIG. 2). While there is adequate light, mode 318 is determined to be "normal light mode" (also referred to herein as normal mode or day mode). Images captured during normal mode are used for generating the video stream 326. For example, images 506 captured during normal mode include a person in the field of view. This person is included in the video stream 326 in frames 510.

At time 502, the ambient light drops below (or reaches) a threshold (e.g., a low light threshold THL or a very low light threshold THVL as described with reference to FIGS. 7-10) at which images 316 are no longer high enough quality for viewing at a user device or for being used as a basis for object/person recognition. At this time, images 316 are combined into composite image frames 512, 514, and 516 (collectively referred to as composite frames 511). One or more of the composite frames 511 are provided for display at a user device because they are high enough quality for objects of interest to be discerned by a user. One or more of the composite frames 511 are also provided to the object and facial recognition modules 244 and 246 because they are high enough quality for computer vision processes to reliably recognize an object type or a facial identity of the detected object/face.

In the example scenario 500, captured frames 507 included a detected object. However, since the ambient light is lower than the normal light level threshold, the object may not be of high enough quality to be discerned by a user or to be relied on for object/facial recognition. However, composite frame 514 is high enough quality for a user to discern the object and for object/facial recognition techniques to recognize a type or identity of the object.

In some implementations, the fusing module 324 generates (or composes, composites, fuses, concatenates, or merges) the composite frames 511 (also referred to herein as multiframe image frames, combined frames, fused frames, concatenated frames, or merged frames) using dynamically selected frame rates, exposure times, and/or component frame quantities. For example, by increasing the exposure for component images 508 (and decreasing the frame capture rate as a result), the image sensor 274 collects more light for each captured image, thereby producing higher quality component images 508. Further, based on the light level, the quantity of component frames 508 per composite frame 512 may increase or decrease. For example, the fusing module 324 may increase the number of component frames 508 used to compose a single composite frame (e.g., frame 512) as the ambient light level decreases. The fusing module 324 may also, or alternatively, increase the exposure of the component frames 508 used to compose a single composite frame (e.g., frame 512) as the ambient light level decreases. For example, exposure times for each component frame may be as low as 48 ms (or lower), and as high as 1 sec (or higher). In some implementations, the number of component frames per composite image may be as low as 6 frames (or lower) or as high as 15 frames (or higher). These adjustments allow the image generation module 324 to produce sharp component images 508 even while collecting more light.

In some implementations, fusing module 324 generates composite frames at an adjustable frame rate, depending on the amount of ambient light available. For instance, in one example implementation, at a certain ambient light level, a composite image 511 is fused from 50 component images 507. If the component images take 0.5 seconds to be generated (e.g., due to increased exposure times), then the component image capture rate of 2 frames per second translates to one composite frame 511 being generated every 25 seconds. Since this amount of time may be too long in certain scenarios, a small amount of light (e.g., from a light source 276) may be emitted in order to raise the ambient light to a level that would require less time to capture the component images, or would require a smaller number of component images to be used to generate the composite image.

In some implementations, motion in the field of view of the image sensor or motion of the camera itself may further affect exposure times used by the fusing module 324. Since longer exposure times negatively affect image quality (e.g., due to movement causing blurring in the image), detection of motion (e.g., by motion detection module 242) may cause the image generation module 234 to decrease exposure times for capturing component images 508, thereby minimizing blurring in the image. For example, the image generation module 234 may decrease the exposure of the component frames 508 used to compose a single composite frame 511 as the amount of, or number of occurrences of, motion in the field of view of the image sensor increases. These adjustments allow the image generation module 234 to produce sharp component images 508 even while collecting more light. Stated another way, if the imaging system is stable and the scene is still, the image generation module 234 may spend more time per frame capturing light to minimize noise. If the imaging system is moving or there is motion in the scene, the image generation module 234 may use shorter exposures for each captured frame, capturing less light to minimize motion blur.

In some implementations, the ambient light level while in low light mode is high enough for component images 508 to be used as a basis for motion detection, but not high enough for the component images 508 to be used as a basis for object recognition. As such, the component images 508 are provided to motion detection module 242, and upon detection of motion, motion detection module 242 causes image generation module 234 to generate composite images 511 for object recognition, as they are of higher quality than the component images. By performing motion detection on the lower quality component images 508, a motion event will be detected closer to the actual occurrence of the motion since component images 508 are generated at a higher rate than composite images 511. Thus, in some implementations, component images 508 serve a dual role (i) as components for the creation of high quality composite images, and (ii) as the basis for motion detection.

Referring back to the example scenario 500, the ambient light returns to the normal level at time 504, at which frames 509 are directly used for creation of an output video stream, as for object/facial recognition, just as frames 506 were used prior to time 502.

As a brief review, referring to FIGS. 3 and 5A, captured frames 506, 508, and 509 are captured by an image sensor 274, stored in an input buffer 262, and used for image generation (module 234), motion detection (module 242) and object/facial recognition (modules 244/246) in normal light conditions, and used as a basis for motion detection (module 242) during certain low light conditions. Frames 510, 511, and 518 are the result of video stream creation at module 234, stored in an output buffer 264 for display as a video stream 332 at a user device, and used as a basis for object/facial recognition (modules 244/246) in low light conditions.

In some implementations, when the light mode transitions to very low light mode (not shown), the captured frames 508 are no longer high enough quality for motion detection to produce reliable results. Accordingly, composite frames 511 are used for both motion detection and object recognition.

Figure 5B:
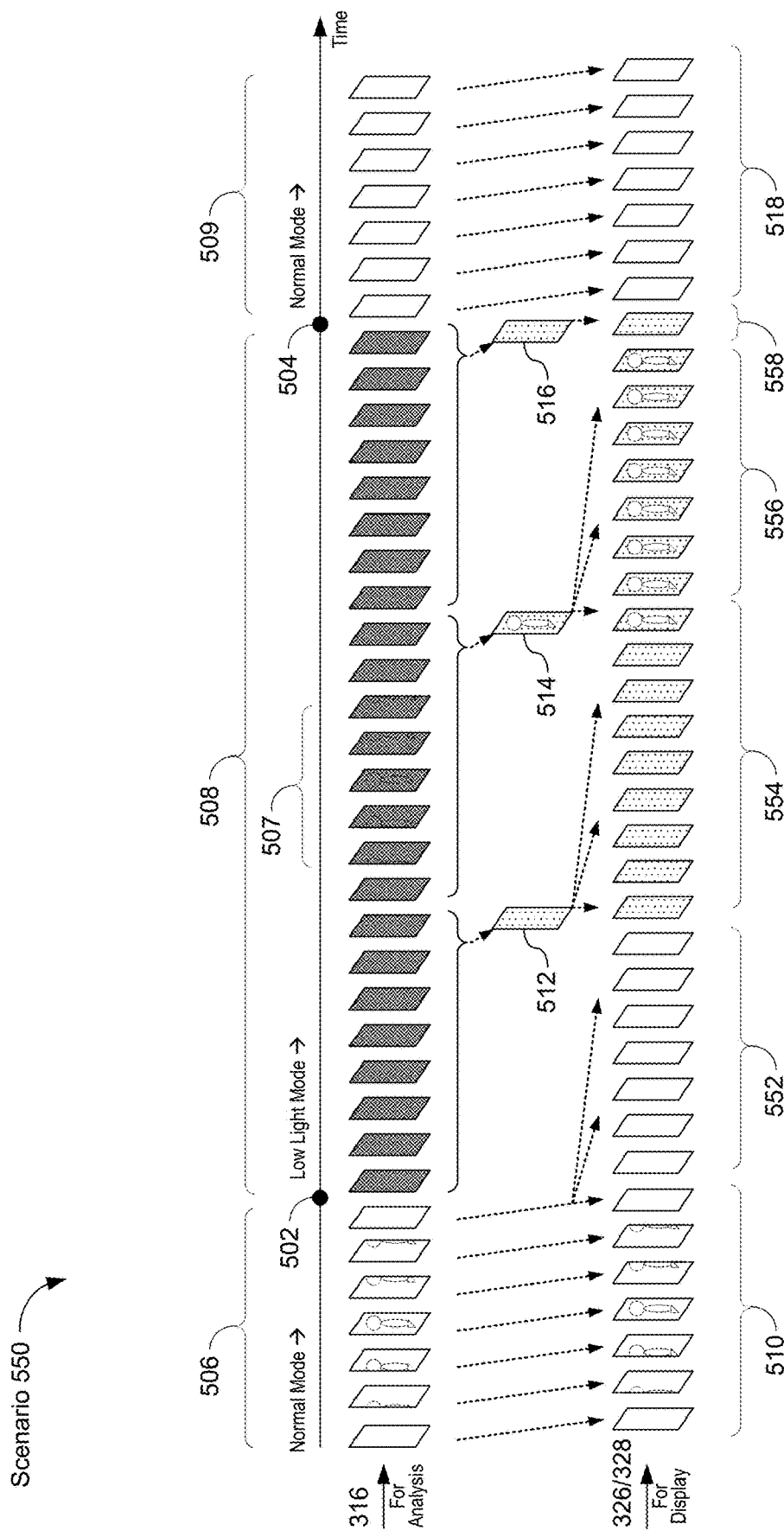

FIG. 5B depicts an example scenario 550 in which a camera module including an image sensor 274 captures successive images 316 (see FIG. 3). This scenario is similar to scenario 500 in FIG. 5A. Corresponding features between the two scenarios are similarly numbered and some are not further discussed for purposes of brevity. In some implementations, the composite images (512, 514, 516) are inserted into the video stream at the nominal frame rate (e.g., the frame rate of the video stream in normal light mode). For example, if the nominal frame rate of the video stream (i.e., the frame rate of the video stream before time 502) is 10 frames per second (fps), but composite frames can only be produced at 1 fps, then each composite frame is duplicated and inserted into the video stream 10 times in order to maintain the nominal frame rate. Referring to FIG. 5B, composite frame 512 is duplicated, and the duplicates (frames 554) are inserted into the video stream at the nominal rate during the time it takes to produce the next composite frame 514. When composite frame 514 is produced, composite frame 514 is duplicated, and the duplicates (frames 556) are inserted into the video stream at the nominal rate during the time it takes to produce the next composite frame 516. When the light mode transitions back to normal light mode (time 504), the captured frames 509 are inserted into the video stream at the nominal rate.

In some implementations, if the transition to normal light mode happens while the next composite frame is being produced, the captured frames 509 are immediately inserted into the video stream without waiting for the next composite frame to be completed, since the frames captured in normal light mode are of the higher quality and captured at the nominal frame rate. In the scenario 550, this transition is depicted at time 504, at which only one instance of composite frame 516 had been inserted into the video stream (frame 558).

In some implementations, one or more of the frames captured during the normal light mode preceding a transition to a low light mode (frames 510) are duplicated and inserted into the video stream at the nominal rate (frames 552) until the first composite frame (512) is produced, thereby maintaining the nominal frame rate during initial processing of the composite frames.

Figure 6:
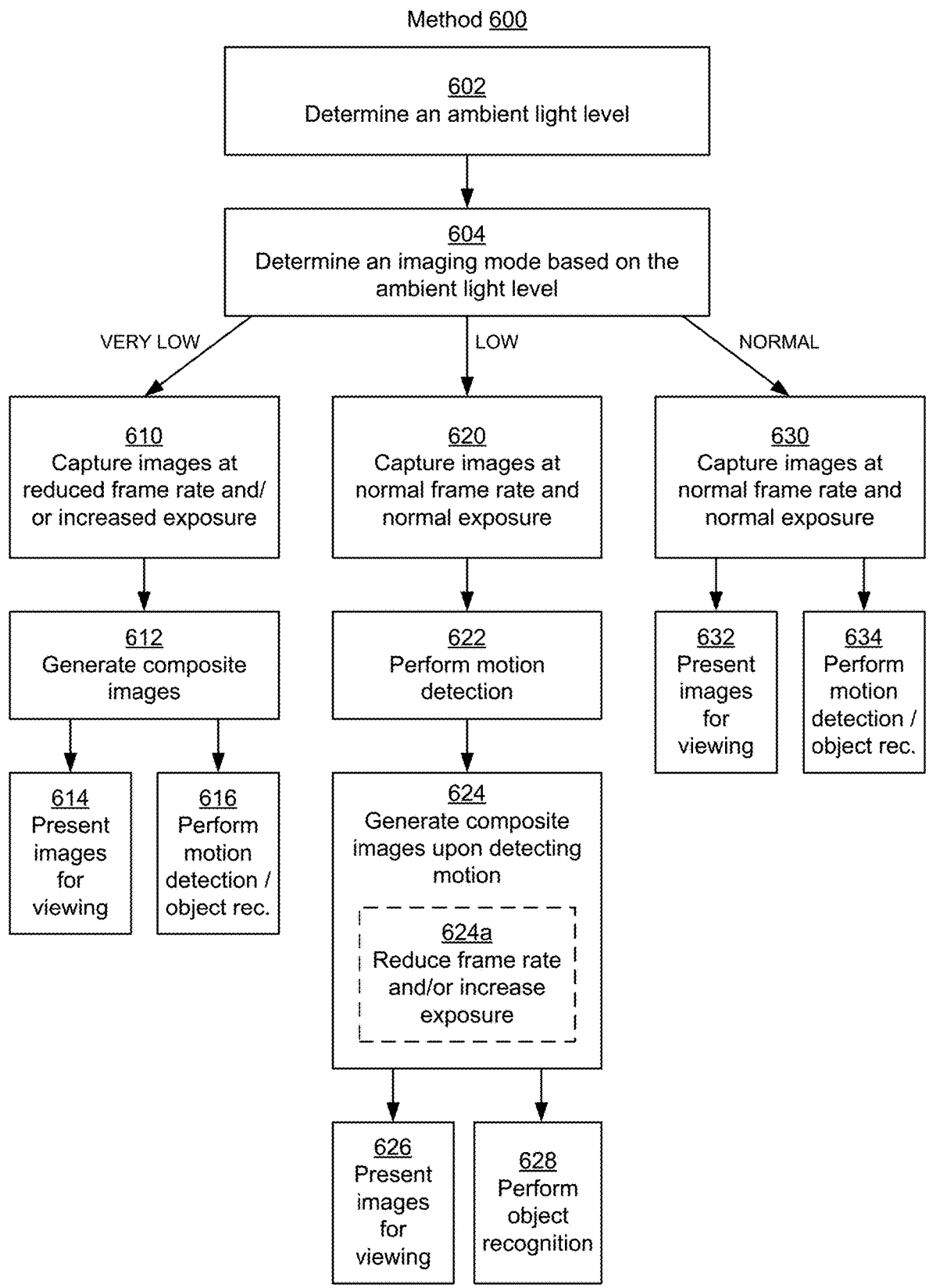
FIG. 6 is a flow chart of an example image processing process in accordance with some implementations.

FIG. 6 is a method 600 of operating an imaging system (e.g., system 310 implemented in an electronic device 200, an assistant device 190, a camera 132, or a doorbell camera 126) in normal, low, and very low levels of ambient light. The method begins with the system (e.g., mode determination module 232) determining (602) an ambient light level. In some implementations, this determination is based on an ambient light sensor 272 or based on attribute data (e.g., color temperature) of captured images 316. Any other process for determining ambient light levels may be implemented without departing from the scope of the inventive concepts described herein. The system (e.g., mode determination module 232) determines (604) an imaging mode based on the ambient light level. Several implementations of this operation are described in more detail below with reference to FIGS. 7-10.

In accordance with a "very low" ambient light level mode determination (i.e., image viewing, motion detection, and object/facial recognition may be inadequate using raw captured images) the system 310 captures (610) component images (e.g., 507) at a reduced frame rate and/or increased exposure, and generates (612) composite images (e.g., 511) by fusing the component images). Alternatively, the system foregoes adjusting the exposure and frame rate of the component images (i.e., skips operation 610), and instead generates composite images using component images captured using the normal image capture technique (e.g., unadjusted frame rate and/or exposure). The system (e.g., modules 234 and 240) presents (614) one or more of the composite images (e.g., 328, 511) for viewing at a user device, either as a still image or a video stream composed of a plurality of composite images, and performs (616) motion detection and/or object/facial recognition using the composite images.

In accordance with a "low" ambient light level mode determination (e.g., image viewing and object/facial recognition may be inadequate using raw captured images, but the raw captured images could still be used for motion detection), the system captures (620) images at the normal frame rate and exposure (i.e., the frame rate and exposure used for the normal imaging mode as discussed above), and performs (622) motion detection on the captured images (e.g., 316). Upon detecting a motion event, the system generates (624) one or more composite images as described with reference to operation 612, optionally adjusting (624a) the frame rate and/or exposure of the raw captured images as described with reference to operation 610. The system (e.g., modules 234 and 240) presents (626) one or more of the composite images (e.g., 328, 511) for viewing at a user device, either as a still image or a video stream composed of a plurality of composite images, and performs (628) object/facial recognition using the composite images.

In accordance with a "normal" ambient light level mode determination (i.e., raw captured images are adequate for image viewing, motion detection, and object/facial recognition), the system captures (630) images at the normal (unadjusted) frame rate and exposure. The system (e.g., modules 234 and 240) presents (632) one or more of the captured images (e.g., 326, 510) for viewing at a user device, either as a still image or a video stream composed of a plurality of captured images, and performs (634) motion detection and/or object/facial recognition using the captured images.

Figure 7:
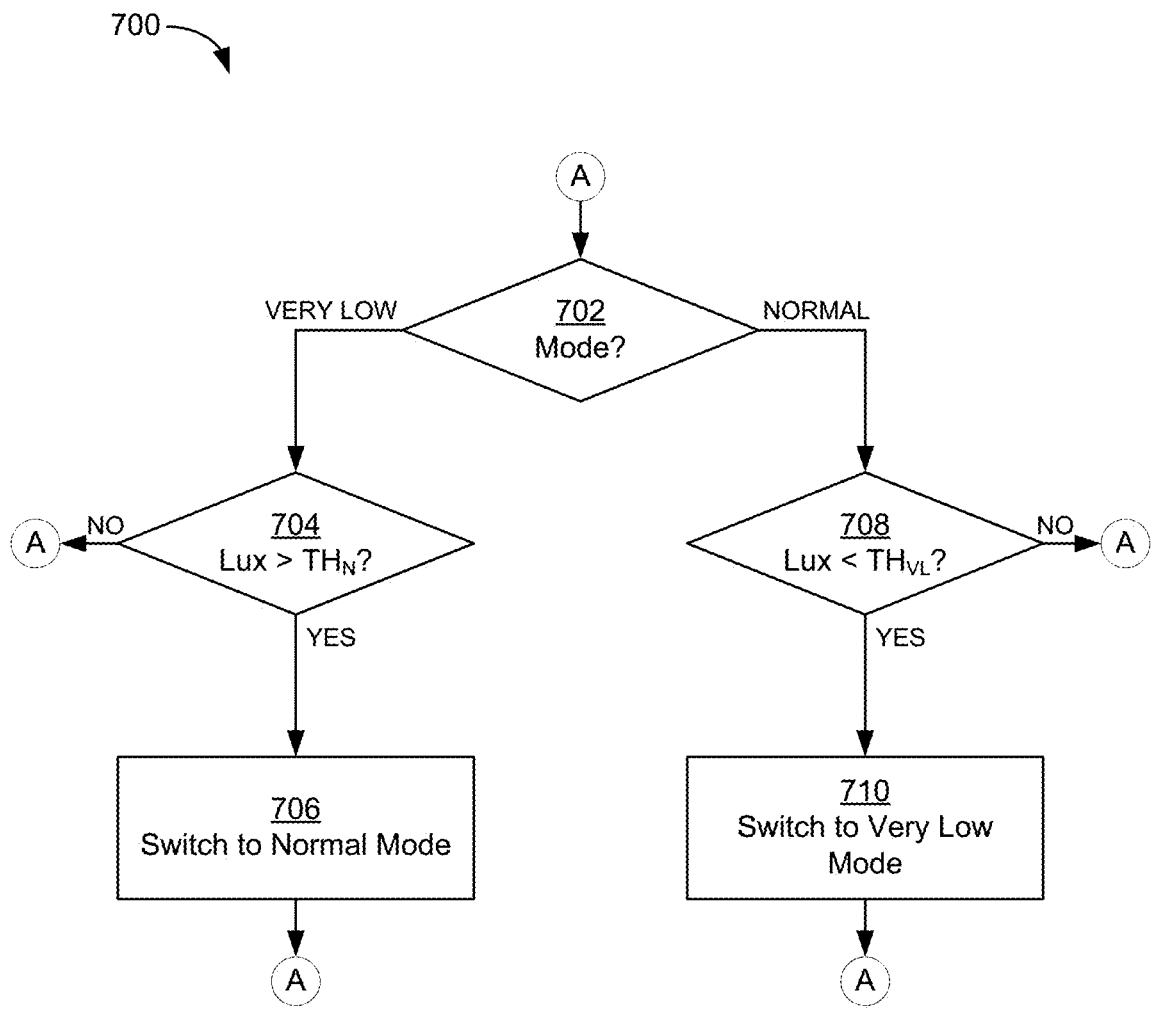
FIG. 7 is a flow chart of an example image processing mode determination process in accordance with some implementations.
Figure 7:
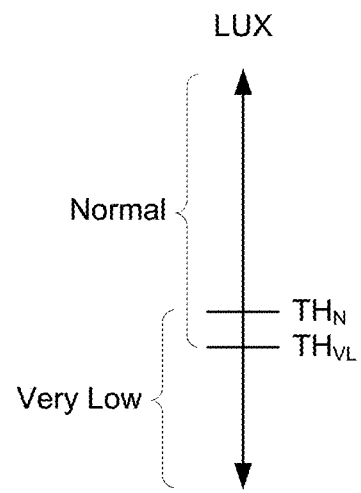
Figure 8:
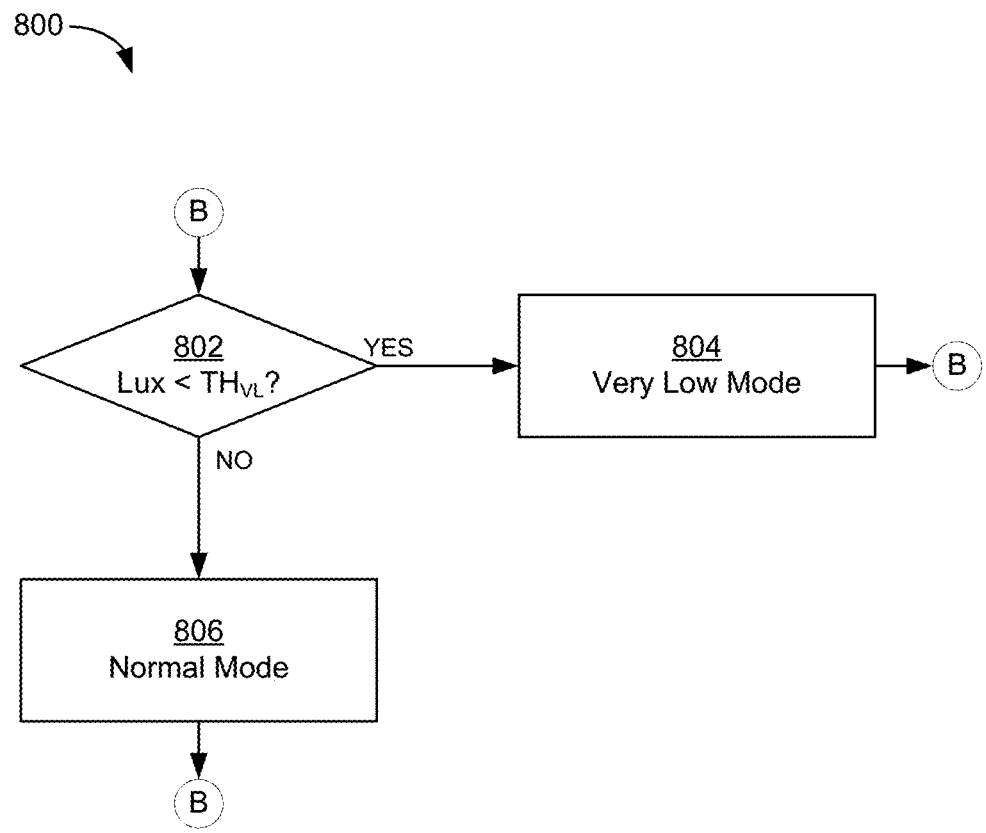
FIG. 8 is a flow chart of an example image processing mode determination process in accordance with some implementations.
Figure 8:
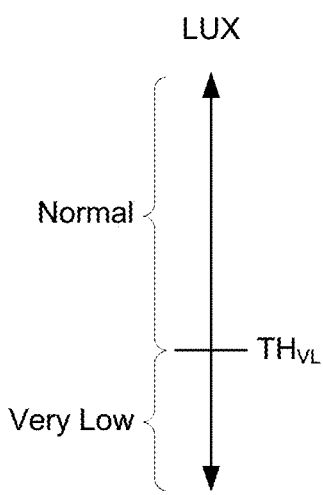

In an alternative embodiment, the imaging system does not implement steps 620-628. Instead, the imaging system determines one of two imaging modes based on the ambient light level: "normal" (steps 630-634, in which image viewing, motion detection, and object/facial recognition are adequate when using captured frames) and "very low" (steps 610-616, in which image viewing, motion detection, and object/facial recognition are adequate only when using composite frames). FIGS. 7 and 8 are example implementations of operation 604 (FIG. 6) for embodiments in which there are only two light modes.

Method 700 in FIG. 7 begins with a determination (702) of a current mode. If the imaging system is currently in very low light mode, the system (e.g., mode determination module 232) compares (704) the current ambient light level (e.g., expressed in lux) to a normal threshold THN (e.g., 30 lux). If the light level is greater than the normal threshold, the system switches (706) to normal mode and the method restarts. If the light level is not greater than the normal threshold, the system remains in very low mode and the method restarts. If the imaging system is currently in normal light mode, the system (e.g., mode determination module 232) compares (708) the current ambient light level to a very low threshold THVL (e.g., 29 lux). If the light level is less than the very low threshold, the system switches (710) to very low mode and the method restarts. If the light level is not less than the very low threshold, the system remains in normal mode and the method restarts. In some implementations, the initial mode determination (702) is skipped when the method 700 restarts. Accordingly, output A from operation 704 returns to operation 704, output A from operation 706 transitions directly to operation 708, output A from operation 708 returns to operation 708, and output A from operation 710 transitions directly to operation 704. The difference in the two thresholds represents the hysteresis needed to prevent oscillation between the normal and very low light modes. In some implementations, the two thresholds are equal and there is no hysteresis.

Method 800 in FIG. 8 begins with the system (e.g., mode determination module 232) comparing (802) a current ambient light level to a very low threshold THVL (e.g., approximately 30 lux). This implementation is appropriate if the current mode is unknown or is otherwise unavailable to the mode determination module 232. If the light level is less than the very low threshold, the system proceeds (804) to very low mode and the method restarts. If the light level is not less than the very low threshold, the system proceeds (806) to normal mode and the method restarts. Alternatively, in operation 804, the system checks to see if it is already in very low mode; if it is, the method restarts, and if it is not, the system switches to very low mode. Likewise, in operation 806, the system alternatively checks to see if it is already in normal mode; if it is, the method restarts, and if it is not, the system switches to normal mode.

Figure 9:
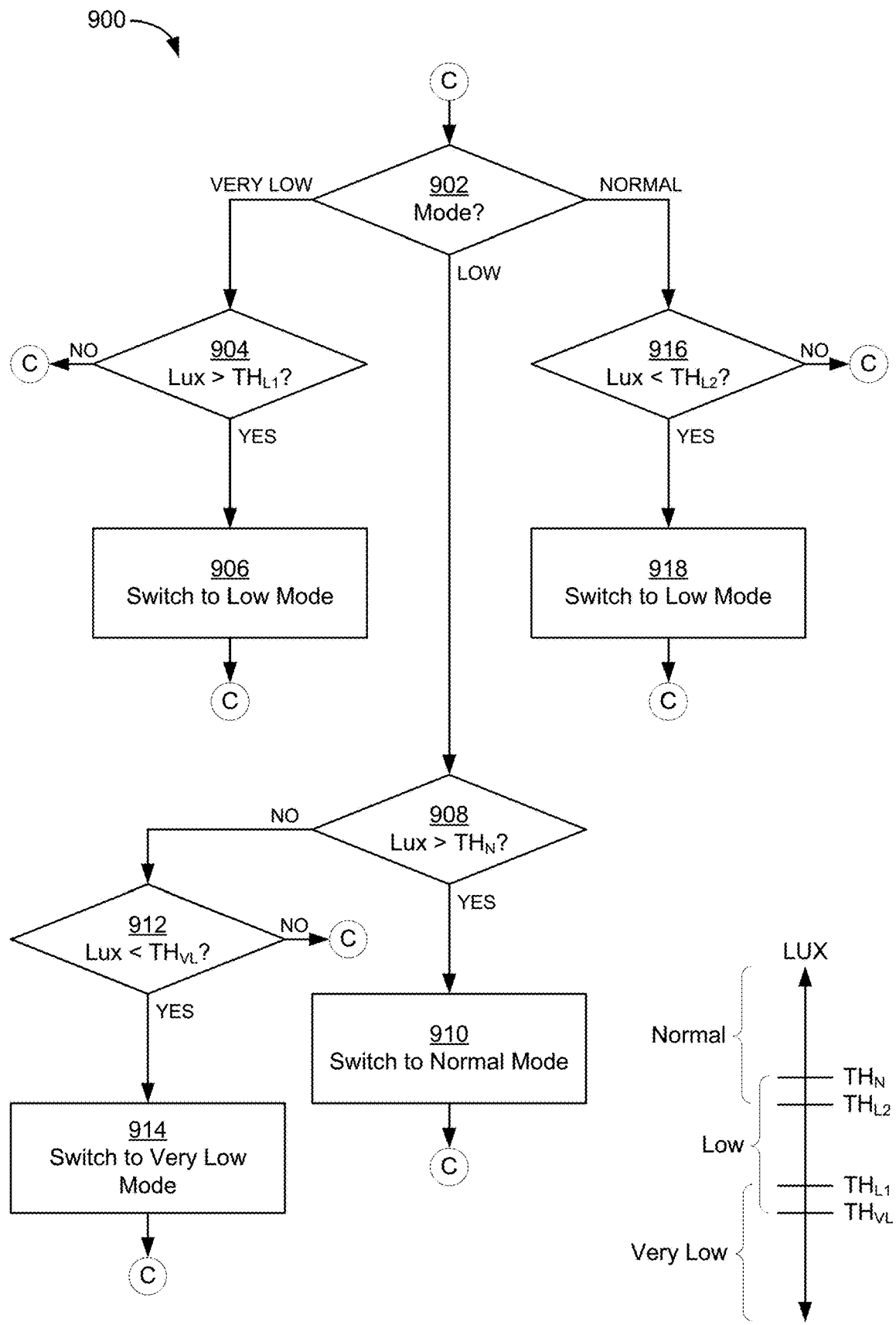
FIG. 9 is a flow chart of an example image processing mode determination process in accordance with some implementations.
Figure 10:
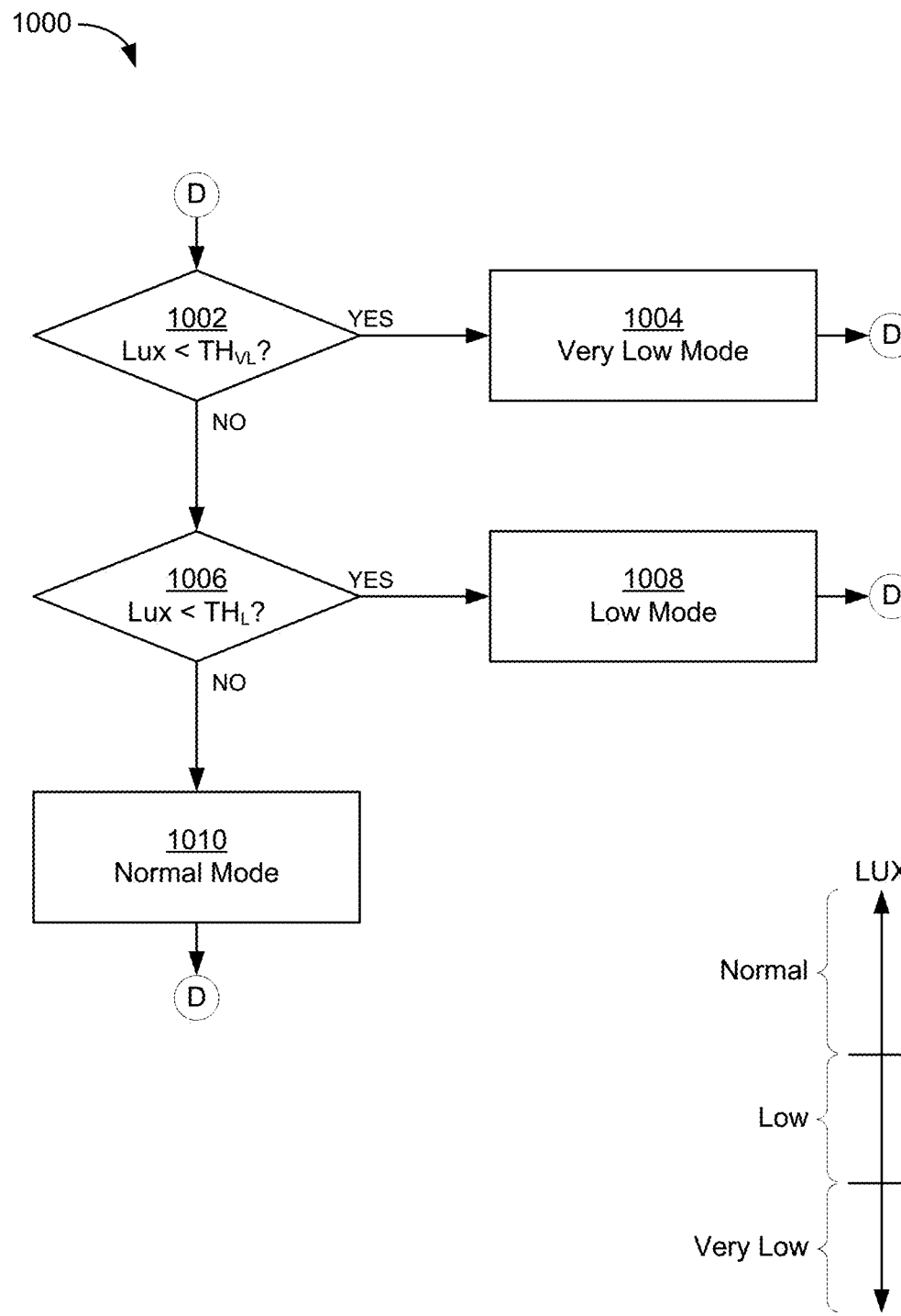
FIG. 10 is a flow chart of an example image processing mode determination process in accordance with some implementations.

FIGS. 9 and 10 are example implementations of operation 604 (FIG. 6) for embodiments in which there are three light modes: "normal" (steps 630-634, in which image viewing, motion detection, and object/facial recognition are adequate when using captured frames), "low" (steps 620-628, in which image viewing and objection/facial recognition are inadequate when using captured frames, but motion detection is adequate when using captured frames), and "very low" (steps 610-616, in which image viewing, motion detection, and object/facial recognition are inadequate when using captured frames).

Method 900 in FIG. 9 begins with the system (e.g., mode determination module 232) determining (902) a current mode. If the current mode is the very low light mode, the system determines (904) if a current ambient light level is greater than a first low threshold THL1 (higher than a very low threshold THVL, e.g., 0.4 lux); if it is, the system switches (906) to low light mode and the method restarts (or transitions directly to operation 908); if it is not, the system remains in very low light mode and the method restarts (or operation 904 repeats). If the current mode is the low light mode, the system determines (908) if a current ambient light level is greater than a normal threshold THN (e.g., 30 lux); if it is, the system switches (910) to normal light mode and the method restarts (or transitions directly to operation 916). If the ambient light level is not greater than the normal threshold, the system determines (912) if the ambient light level is less than a very low threshold THVL (e.g., 0.3 lux); if it is, the system switches (914) to very low light mode and the method restarts (or transitions directly to operation 904); if it is not, the system remains in low light mode and the method restarts (or transitions directly to operation 908). If the current mode is the normal light mode, the system determines (916) if a current ambient light level is less than a second low threshold THL2 (higher than the first low threshold THL1 and lower than the normal threshold THN, e.g., 29 lux); if it is, the system switches (918) to low light mode and the method restarts (or transitions directly to operation 908); if it is not, the system remains in the normal light mode and the method restarts (or repeats operation 916). The difference in the thresholds THN and THL2 represents the hysteresis needed to prevent oscillation between the normal and low light modes, and the difference in the thresholds THL1 and THVL represents the hysteresis needed to prevent oscillation between the low and very low light modes. In some implementations, the thresholds THN and THL2 are equal, and/or the thresholds THL1 and THVL are equal, and there is no hysteresis.

Method 1000 in FIG. 10 begins with the system (e.g., mode determination module 232) comparing (1002) a current ambient light level to a very low threshold THVL (e.g., 0.3 lux). This implementation is appropriate if the current mode is unknown or is otherwise unavailable to the mode determination module 232. If the light level is less than the very low threshold, the system proceeds (1004) to very low mode and the method restarts. If the light level is not less than the very low threshold, the system compares (1006) a current ambient light level to a low threshold (higher than the very low threshold, e.g., 30 lux). If the light level is less than the low threshold, the system proceeds (1008) to low mode and the method restarts. If the light level is not less than the low threshold, the system proceeds (1010) to normal mode and the method restarts. Alternatively, in operation 1004, the system checks to see if it is already in very low mode; if it is, the method restarts, and if it is not, the system switches to very low mode. Likewise, in operation 1008, the system alternatively checks to see if it is already in low mode; if it is, the method restarts, and if it is not, the system switches to low mode; and in operation 1010, the system alternatively checks to see if it is already in normal mode; if it is, the method restarts, and if it is not, the system switches to normal mode.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "environments" may refer to homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method comprising:
   determining whether an ambient light level is less than a first threshold value;
   in accordance with a determination that the ambient light level is less than the first threshold value, detecting motion within a field of view of one or more sensors of an electronic device, the one or more sensors comprising at least one image sensor; and
   in accordance with detecting motion:
      receiving a first plurality of images captured by the at least one image sensor of the electronic device;
      forming a composite image from two or more images of the first plurality of images; and
      causing the composite image to be presented for display on a user device.

2. The method of claim 1, further comprising performing an object recognition process on the composite image.

3. The method of claim 1, further comprising, prior to determining whether the ambient light level is less than the first threshold value, receiving a first plurality of images of a scene captured by one or more image sensors of the electronic device.

4. The method of claim 3, wherein the determination that the ambient light level is less than the first threshold value is based on an analysis of the first plurality of images of the scene.

5. The method of claim 1, further comprising:
   prior to determining whether an ambient light level is less than a first threshold value, receiving, via a light sensor, an ambient light level, and wherein the determination that the ambient light level is less than the first threshold value is based on the ambient light level proximate to the electronic device.

6. The method of claim 1, further comprising:
   determining whether the ambient light level is less than a second threshold value which is lower than the first threshold value; and
   in accordance with a determination that the ambient light level is less than the second threshold value:
      receiving a second plurality of images captured by the one or more image sensors of the electronic device;
      forming a second composite image from two or more of the second plurality of images; and
      causing the second composite image to be presented for display on the user device.

7. The method of claim 1, further comprising:
   in accordance with a determination that the ambient light level is not less than the first threshold value:
      receiving a third plurality of images captured by the one or more image sensors of the electronic device;
      detecting motion in a scene based on one or more of the third plurality of images; and
      in accordance with detecting motion in the scene, performing an object recognition process on one or more of the third plurality of images.

8. The method of claim 7, further comprising causing one or more of the third plurality of images to be presented for display on the user device.

9. An electronic device having one or more processors and memory storing one or more instructions, which, when executed by the one or more processors, cause the one or more processors to:
   determine whether an ambient light level is less than a first threshold value;
   in accordance with a determination that the ambient light level is less than the first threshold value, detect motion within a field of view of one or more sensors of an electronic device, the one or more sensors comprising at least one image sensor; and
   in accordance with the detection of motion:
      receive a first plurality of images captured by the at least one image sensor;

form a composite image from two or more images of the first plurality of images; and cause the composite image to be presented for display on a user device.

10. The electronic device of claim 9, wherein the memory further comprises instructions, which, when executed by the one or more processors, further cause the electronic device to:

perform an object recognition process on the composite image.

11. The electronic device of claim 9, wherein the memory further comprises instructions, which, when executed by the one or more processors, further cause the electronic device to:

receive, prior to determining whether the ambient light level is less than the first threshold value, a first plurality of images of a scene captured by one or more image sensors of an electronic device, and wherein the determination that the ambient light level is less than the first threshold value is based on an analysis of the first plurality of images of the scene.

12. The electronic device of claim 9, wherein the memory further comprises instructions, which, when executed by the one or more processors, further cause the electronic device to:

determine whether the ambient light level is less than a second threshold value which is lower than the first threshold value; and in accordance with a determination that the ambient light level is less than the second threshold value:
receive a second plurality of images;
form a second composite image from two or more of the second plurality of images; and
cause the second composite image to be presented for display on the user device.

13. The electronic device of claim 9, wherein the memory further comprises instructions, which, when executed by the one or more processors, further cause the electronic device to:

in accordance with a determination that the ambient light level is not less than the first threshold value:
receive a third plurality of images;
detect motion in a scene based on one or more of the third plurality of images; and
in accordance with detecting motion in the scene, perform an object recognition process on one or more of the third plurality of images.

14. The electronic device of claim 13, wherein the memory further comprises instructions, which, when executed by the one or more processors, further cause the electronic device to:

cause one or more of the third plurality of images to be presented for display on the user device.

15. A non-transitory computer readable storage medium storing one or more programs, the one or more programs comprising instructions, which, when executed by one or more processors, cause the one or more processors to:

determine whether an ambient light level is less than a first threshold value;

in accordance with a determination that the ambient light level is less than the first threshold value, detect motion within a field of view of one or more sensors of an electronic device, the one or more sensors comprising at least one image sensor; and in accordance with a detection of motion:
receive a first plurality of images captured by the at least one image sensor;
form a composite image from two or more of the first plurality of images; and
cause the composite image to be presented for display on a user device.

16. The non-transitory computer readable storage medium of claim 15, wherein the one or more programs further comprise instructions, which, when executed by one or more processors, further cause the one or more processors to:

perform an object recognition process on the composite image.

17. The non-transitory computer readable storage medium of claim 15, wherein the one or more programs further comprise instructions, which, when executed by one or more processors, further cause the one or more processors to:

detect motion within one or more images of the first plurality of images.

18. The non-transitory computer readable storage medium of claim 15, wherein the one or more programs further comprise instructions, which, when executed by one or more processors, further cause the one or more processors to:

determine whether the ambient light level is less than a second threshold value which is lower than the first threshold value; and in accordance with a determination that the ambient light level is less than the second threshold value:
receive a second plurality of images;
form a second composite image from two or more of the second plurality of images; and
cause the second composite image to be presented for display on the user device.

19. The non-transitory computer readable storage medium of claim 15, wherein the one or more programs further comprise instructions, which, when executed by one or more processors, further cause the one or more processors to:

in accordance with a determination that the ambient light level is not less than the first threshold value:
receive a third plurality of images of a scene;
detect motion in the scene based on one or more of the third plurality of images; and
in accordance with detecting motion, perform an object recognition process on one or more of the third plurality of images.

20. The non-transitory computer readable storage medium of claim 19, wherein the one or more programs further comprise instructions, which, when executed by one or more processors, further cause the one or more processors to:

cause one or more of the third plurality of images to be presented for display on the user device.

* * * * *